United States Patent
Ishikura et al.

(12) 
(10) Patent No.: US 6,449,499 B1
(45) Date of Patent: Sep. 10, 2002

(54) DUAL-MODE RADIO CONNECTED TO AN APPARATUS FOR COMMUNICATING THROUGH IN ANALOG MODE

(75) Inventors: Akira Ishikura, Kawasaki; Osamu Kurokawa, Tokyo; Yoshihiro Nomura, Tokyo; Masakuni Hyodo, Tokyo; Ken Nakamura, Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/204,306

(22) Filed: Dec. 3, 1998

(30) Foreign Application Priority Data

Dec. 4, 1997 (JP) .............................................. 9-334365

(51) Int. Cl.$^7$ ................................................ H04B 1/40
(52) U.S. Cl. ........................................ 455/571; 455/553
(58) Field of Search ................................. 455/553, 552, 455/556, 557, 571, 569

(56) References Cited

U.S. PATENT DOCUMENTS

| | | | | |
|---|---|---|---|---|
| 5,450,471 A | * | 9/1995 | Hanawa | 379/58 |
| 5,450,620 A | * | 9/1995 | Vaisanen | 455/127 |
| 5,493,707 A | * | 2/1996 | Kamitani | 455/127 |
| 5,548,803 A | * | 8/1996 | Evans | 455/16 |
| 5,794,159 A | * | 8/1998 | Portin | 455/553 |
| 5,890,077 A | * | 3/1999 | Hanawa | 455/571 |
| 6,021,332 A | * | 2/2000 | Alberth | 455/552 |
| 6,138,010 A | * | 10/2000 | Rabe | 455/426 |

* cited by examiner

Primary Examiner—Daniel Hunter
Assistant Examiner—Nick Corsaro
(74) Attorney, Agent, or Firm—Finnegan, Henderson, Farabow, Garrett & Dunner, L.L.P.

(57) ABSTRACT

This invention provides a dual-mode radio communication apparatus which can make normal communications even when an external apparatus is connected to a radio communication apparatus, the communication scheme of which is set in a digital mode. When the radio communication apparatus is not connected to a vehicle-mount kit via a connector in an analog mode, a switch control means of a controller switches a switching circuit to communicate a signal with a base station using a built-in antenna. When the apparatus is connected to the vehicle-mount kit, the switch control means switches the switching circuit to communicate a signal with the base station using an external antenna via the vehicle-mount kit and a booster unit. In the digital mode, the switch control means switches the switching circuit to communicate a signal with the base station using the built-in antenna independently of the connection with the vehicle-mount kit.

17 Claims, 7 Drawing Sheets

| SWITCHING CIRCUIT | DIGITAL MODE | | | ANALOG MODE | | |
|---|---|---|---|---|---|---|
| | CONNECTED TO CONNECTOR | | NOT CONNECTED TO CONNECTOR | CONNECTED TO CONNECTOR | | NOT CONNECTED TO CONNECTOR |
| | MOUNTED | NOT MOUNTED | | MOUNTED | NOT MOUNTED | |
| 102 | ANTENNA SIDE | | | CONNECTOR SIDE | | ANTENNA SIDE |
| 110, 111 | PCM CODE PROCESSING UNIT | | | ANALOG AUDIO CIRCUIT SIDE | | |
| 112 | CONNECTOR SIDE | LOUDSPEAKER SIDE | LOUDSPEAKER SIDE | CONNECTOR SIDE | LOUDSPEAKER SIDE | LOUDSPEAKER SIDE |
| 113 | CONNECTOR SIDE | MICROPHONE SIDE | MICROPHONE SIDE | CONNECTOR SIDE | MICROPHONE SIDE | MICROPHONE SIDE |
| 132 | CONNECTOR SIDE | | POWER SUPPLY CIRCUIT SIDE | CONNECTOR SIDE | | POWER SUPPLY CIRCUIT SIDE |

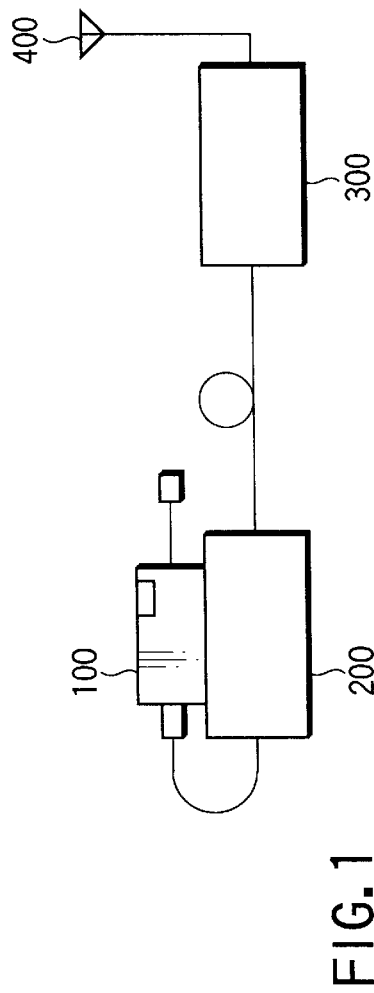

FIG. 1

| SWITCHING CIRCUIT | DIGITAL MODE | | | ANALOG MODE | | | |
|---|---|---|---|---|---|---|---|
| | CONNECTED TO CONNECTOR | | NOT CONNECTED TO CONNECTOR | CONNECTED TO CONNECTOR | | NOT CONNECTED TO CONNECTOR | |
| | MOUNTED | NOT MOUNTED | | MOUNTED | NOT MOUNTED | | |
| 102 | ANTENNA SIDE | | | CONNECTOR SIDE | | ANTENNA SIDE | |
| 110, 111 | PCM CODE PROCESSING UNIT | | | ANALOG AUDIO CIRCUIT SIDE | | | |
| 112 | CONNECTOR SIDE | LOUDSPEAKER SIDE | LOUDSPEAKER SIDE | CONNECTOR SIDE | LOUDSPEAKER SIDE | LOUDSPEAKER SIDE | |
| 113 | CONNECTOR SIDE | MICROPHONE SIDE | MICROPHONE SIDE | CONNECTOR SIDE | MICROPHONE SIDE | MICROPHONE SIDE | |
| 132 | CONNECTOR SIDE | | POWER SUPPLY CIRCUIT SIDE | CONNECTOR SIDE | | POWER SUPPLY CIRCUIT SIDE | |

FIG. 3

DUAL-MODE RADIO CONNECTED TO AN APPARATUS FOR COMMUNICATING THROUGH IN ANALOG MODE

BACKGROUND OF THE INVENTION

The present invention relates to a dual-mode radio communication apparatus capable of communications by selectively using one of analog and digital communication modes, a vehicle-mount kit for supplying electric power to the radio communication apparatus from a battery of a vehicle, and a booster unit for power-amplifying transmission/reception signals of the radio communication apparatus.

As is well known, when one wants to stably use a radio communication apparatus such as a portable telephone in a mobile station such as a vehicle, it is a common practice to use it by connecting a power supply device (so-called vehicle-mount kit) 200, RF signal amplifier (so-called booster unit) 300, and external antenna 400 to a radio communication apparatus 100, as shown in FIG. 1.

The vehicle-mount kit 200 is connected to the radio communication apparatus 100 via a connector to supply electric power thereto from a vehicle-mount battery, and has a hand-free function that allows the user to talk even as he or she does not hold the radio communication apparatus 100. The booster unit 300 amplifies the signal strength of a transmission signal from the radio communication apparatus 100, and that of a reception signal received by the external antenna 400.

In recent years, as a new radio communication terminal apparatus, a dual-mode radio communication apparatus which allows the user to select one of an analog communication mode and a digital communication mode such as CDMA (Code Division Multiple Access) as needed upon communications is available.

When this dual-mode radio communication apparatus is connected to a booster unit which can be used in the analog mode, and is used in the CDMA (digital) mode, since the control lower limit of the transmission output level in the CDMA mode is much lower than that in the analog mode, it is hard to detect the input signal. Also, upon burst transmission, since the start timing of an amplifier unit is delayed, the booster unit does not normally operate, thus disturbing transmission/reception.

BRIEF SUMMARY OF THE INVENTION

The present invention has been made to solve the aforementioned problems, and has as its object to provide a dual-mode radio communication apparatus which allow communications via connected equipment when the dual-mode radio communication apparatus is set in an analog mode, and also allow communications even upon connection when the dual-mode radio communication apparatus is set in a digital mode, power supply device, and RF signal amplifier.

According to one aspect of the present invention, there is provided a dual-mode radio communication apparatus capable of communicating with a base station which can be connected to a public network, by selectively using one of communication modes including an analog mode and digital mode, comprising: communication means upon connected to an external apparatus, for communicating an RF signal directly to the base station in the digital mode, and for communicating the RF signal to the base station via the external apparatus in the analog mode.

In the dual-mode radio communication apparatus with the above arrangement, upon connected to an external apparatus, when a communication is made in the digital mode, an RF signal is directly communicated to the base station; when a communication is made in the analog mode, an RF signal is communicated to the base station via the external apparatus.

Therefore, according to the dual-mode radio communication apparatus with the above arrangement, even when the apparatus is used by being connected to a booster unit, since a communication is made in the digital mode without the intervention of the booster unit, the communication can be made even if the booster unit is not compatible with the digital mode.

According to another aspect of the present invention, there is provided a dual-mode radio communication apparatus capable of communicating with a base station, which can be connected to a public network, by selectively using one of communication modes including an analog mode and digital mode, comprising: a portable unit having an input/output terminal of an RF signal to be communicated with the base station; an antenna for transmitting/receiving the RF signal; an interface unit for inputting/outputting the RF signal; and connection switching means upon connecting an external apparatus to the interface unit for connecting the RF signal input/output terminal of the portable unit directly to the antenna in the digital mode, and connecting the RF signal input/output terminal of the portable unit to the antenna via the interface unit in the analog mode.

In the dual-mode radio communication apparatus with the above arrangement, upon connecting an external apparatus to the interface unit, a communication in the digital mode is made directly using the antenna without the intervention of the interface unit, while a communication in the analog mode is made using the antenna via the interface unit.

Therefore, according to the dual-mode radio communication apparatus with the above arrangement, even when the apparatus is used by connecting a booster unit to the interface, since the communication in digital mode is made directly using the antenna without the intervention of the interface, the communication can be made even if the booster unit is not compatible with the digital mode.

Also, according to the dual-mode radio communication apparatus with the above arrangement, since the digital and analog modes use an identical antenna, only one antenna is used.

According to still another aspect of the present invention, there is provided a dual-mode radio communication apparatus capable of communicating with a base station, which can be connected to a public network, by selectively using one of communication modes including an analog mode and digital mode, comprising: a portable unit having an input/output terminal of an RF signal to be communicated with the base station; a first antenna for transmitting/receiving the RF signal; a second antenna for transmitting/receiving the RF signal; an interface unit which is connected to the second antenna and inputs/outputs the RF signal via the second antenna; and connection switching means upon connecting an external apparatus to the interface unit for connecting the RF signal input/output terminal of the portable unit to the first antenna in the digital mode, and connecting the RF signal input/output terminal of the portable unit to the interface unit in the analog mode.

With the dual-mode radio communication apparatus with the above arrangement, upon connecting an external apparatus to the interface unit, a communication in the digital mode is made directly using the first antenna without the intervention of the interface unit, while a communication in the analog mode is made using the second antenna via the interface.

Hence, according to the dual-mode radio communication apparatus with the above arrangement, even when the apparatus is used by connecting a booster unit to the interface, since the communication is made directly using the first antenna without the intervention of the interface, the communication in digital mode can be made even if the booster unit is not compatible with the digital mode.

Also, according to the dual-mode radio communication apparatus with the above arrangement, since the digital and analog modes use independent antennas, the arrangement of the connection switching means can be simplified.

According to still another aspect of the present invention, there is provided a dual-mode radio. communication apparatus capable of communicating with a base station which can be connected to a public network, by selectively using one of communication modes including an analog mode and digital mode, comprising: a portable unit which comprises a first antenna for transmitting/receiving an RF signal to be communicated with the base station, and has an input/output terminal of the RF signal; an interface unit which is connected to a second antenna for transmitting/receiving the RF signal, and inputs/outputs the RF signal; and connection switching means upon connecting an external apparatus to the interface unit for connecting the RF signal input/output terminal of the portable unit to the first antenna in the digital mode, and connecting the RF signal input/output terminal of the portable unit to the interface unit in the analog mode.

In the dual-mode radio communication apparatus with the above arrangement, upon connecting an external apparatus to the interface, a communication in the digital mode is made using a built-in antenna of the portable unit, while a communication in the analog mode is made using an external antenna via the interface.

Hence, according to the dual-mode radio communication apparatus with the above arrangement, even when the apparatus is used by connecting a booster unit to the interface, since a communication is made in the digital mode using the built-in antenna of the portable unit, the communication can be made even when the booster unit is not compatible with the digital mode. Also, no external antenna for the digital mode is required.

According to still another aspect of the present invention, there is provided a power supply device for generating an operation power supply voltage on the basis of an output from a battery equipped in a mobile station, and supplying the operation power supply voltage to a radio communication apparatus, comprising: antenna connection means connected to an antenna for communicating an RF signal to be communicated between a base station and the radio communication apparatus; a booster unit for amplifying the RF signal; and connection switching means for inhibiting the electrical power from supplying to the booster unit and for connecting an RF signal input/output terminal of the radio communication apparatus directly to the antenna connection means when the radio communication apparatus communicates in a digital mode, and for enabling the electrical power to be supplied to the booster unit and for connecting the RF signal input/output terminal of the radio communication apparatus to the antenna connection means via the booster unit when the radio communication apparatus communicates in an analog mode.

The power supply device with the above arrangement comprises the antenna connection means for connecting the antenna used in a communication with the base station, and the booster unit for amplifying an RF signal. When a communication is made in the digital mode, the RF signal input/output terminal of the radio communication apparatus is connected to the antenna connection means. When a communication is made in the analog mode, the RF signal input/output terminal of the radio communication apparatus is connected to the antenna connection means via the booster unit.

Therefore, according to the power supply device with the above arrangement, since a communication is made in the digital mode using the antenna connected to the antenna connection means, while a communication is made in the analog mode using the antenna via the booster unit that amplifies an RF signal, the communication can be made even when the booster unit is not compatible with the digital mode.

Also, according to the power supply device with the above arrangement, since the digital and analog modes use an identical antenna, only one antenna is used.

According to still another aspect of the present invention, there is provided a power supply device for generating an operation power supply voltage on the basis of an output from a battery equipped in a mobile station, and supplying the operation power supply voltage to a radio communication apparatus, comprising: first antenna connection means connected to a first antenna for communicating an RF signal to be communicated between a base station and the radio communication apparatus; second antenna connection means connected to a second antenna for communicating the RF signal to be communicated between the base station and the radio communication apparatus; a booster unit which is connected to the second antenna connection means and amplifies the RF signal transmitted/received via the second antenna connection means; and connection switching means for inhibiting the electrical power from supplying to the booster unit and for connecting an RF signal input/output terminal of the radio communication apparatus to the first antenna connection means when the radio communication apparatus communicates in a digital mode, and for enabling the electrical power to be supplied to the booster unit and for connecting the RF signal input/output terminal of the radio communication apparatus to the booster unit when the radio communication apparatus communicates in an analog mode.

The power supply device with the above arrangement comprises the first antenna connection means for connecting the first antenna used in a communication with the base station, the second antenna connection means for connecting the second antenna used in a communication with the base station, and the booster unit which is connected to the second antenna connection means and amplifies an RF signal, and connects the RF signal input/output terminal of the radio communication apparatus to the first antenna connection means when a communication is made in the digital mode, while it connects the RF signal input/output terminal of the radio communication apparatus to the booster unit when a communication is made in the analog mode.

Hence, according to the power supply device with the above arrangement, since a communication in the digital mode is made using the first antenna via the first antenna communication means, while a communication in the analog mode is made using the second antenna via the booster unit, the communication can be made even when the booster unit is not compatible with the digital mode.

Also, according to the power supply device with the above arrangement, since the digital and analog modes use independent antennas, the arrangement of the connection switching means can be simplified.

According to still another aspect of the present invention, there is provided an RF signal amplifier comprising: antenna connection means for connecting an antenna which transmits/receives an RF signal to be communicated between a base station and a radio communication apparatus; RF signal amplification means for amplifying the RF signal; and connection switching means for connecting an RF signal input/output terminal of the radio communication apparatus directly to the antenna connection means when the radio communication apparatus communicates in a digital mode, and connecting the RF signal input/output terminal of the radio communication apparatus to the antenna connection means via the RF signal amplification means when the radio communication apparatus communicates in the analog mode.

The RF signal amplifier with the above arrangement comprises the antenna connection means for connecting the antenna used in a communication with the base station, and the RF signal amplification means for amplifying an RF signal, and connects the RF signal input/output terminal of the radio communication apparatus to the antenna connection means when a communication is made in the digital mode, while it connects the RF signal input/output terminal of the radio communication apparatus to the antenna connection means via the RF signal amplification means when a communication is made in the analog mode.

Consequently, according to the RF signal amplifier with the above arrangement, since a communication is made in the digital mode directly using the antenna means without the intervention of the RF signal amplification means, while a communication is made in analog mode using the antenna means via the RF signal amplification means, the communication can be made even when the RF signal amplification means is not compatible with the digital mode.

Also, according to the RF signal amplifier with the above arrangement, since the digital and analog modes use an identical antenna, only one antenna is used.

According to still another aspect of the present invention, there is provided an RF signal amplifier comprising: first antenna connection means for connecting a first antenna which transmits/receives an RF signal to be communicated between a base station that can be connected to a public network, and a radio communication apparatus; second antenna connection means for connecting a second antenna which transmits/receives the RF signal; RF signal amplification means, connected to the second antenna connection means, for amplifying the RF signal transmitted/received via the second antenna connection means; and connection switching means for connecting an RF signal input/output terminal of the radio communication apparatus to the first antenna connection means when the radio communication apparatus communicates in a digital mode, and connecting the RF signal input/output terminal of the radio communication apparatus to the RF signal amplification means when the radio communication apparatus communicates in the analog mode.

The RF signal amplifier with the above arrangement comprises the first antenna connection means for connecting the first antenna used in a communication with the base station, the second antenna connection means for connecting the second antenna used in a communication with the base station, and the RF signal amplification means, connected to the second antenna connection means, for amplifying an RF signal, and connects the RF signal input/output terminal of the radio communication apparatus to the first antenna connection means when a communication is made in the digital mode, while it connects the RF signal input/output terminal of the radio communication apparatus to the RF signal amplification means when a communication is made in the analog mode.

According to the RF signal amplifier with the above arrangement, since a communication is made in the digital mode directly using the first antenna without the intervention of the RF signal amplification means, while a communication is made in the analog mode using the second antenna via the RF signal amplification means, the communication can be made even when the RF signal amplification means is not compatible with the digital mode.

Also, according to the RF signal amplifier with the above arrangement, since the digital and analog modes use independent antennas, the arrangement of the connection switching means can be simplified.

According to still another aspect of the present invention, there is provided a dual-mode radio communication apparatus capable of communicating with a base station which can be connected to a public network, by selectively using one of communication modes including an analog mode and digital mode, comprising: generating means for generating an RF signal to be transmitted; and communication means, upon connecting the communication apparatus to a booster device for boosting the generated RF signal, for transmitting the generated RF signal directly to the base station in the digital mode, and for transmitting the boosted signal to the base station via the booster device in the analog mode.

Furthermore, according to this embodiment, the amplifier comprises identification information extraction means for extracting communication mode identification information superposed on an RF signal input from the radio communication apparatus, and when the information extracted by this means indicates the digital mode, a connection is made without the intervention of the RF signal amplification means.

Therefore, according to the present invention, since neither terminals for inputting/outputting an identification signal of the communication mode nor a cable for connecting these terminals are required, the communication mode can be informed by a simple connection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing the connections among a vehicle-mount kit, booster unit, and the like, when one wants to stably use a mobile communication terminal apparatus in, e.g., a vehicle;

FIG. 3 is a table which summarizes the control for a switching circuit by a switch control means: of the dual-mode radio communication apparatus shown in FIG. 2;

DETAILED DESCRIPTION OF THE INVENTION

The preferred embodiments of the present invention will be described hereinafter with reference to the accompanying drawings.

Figure 2:
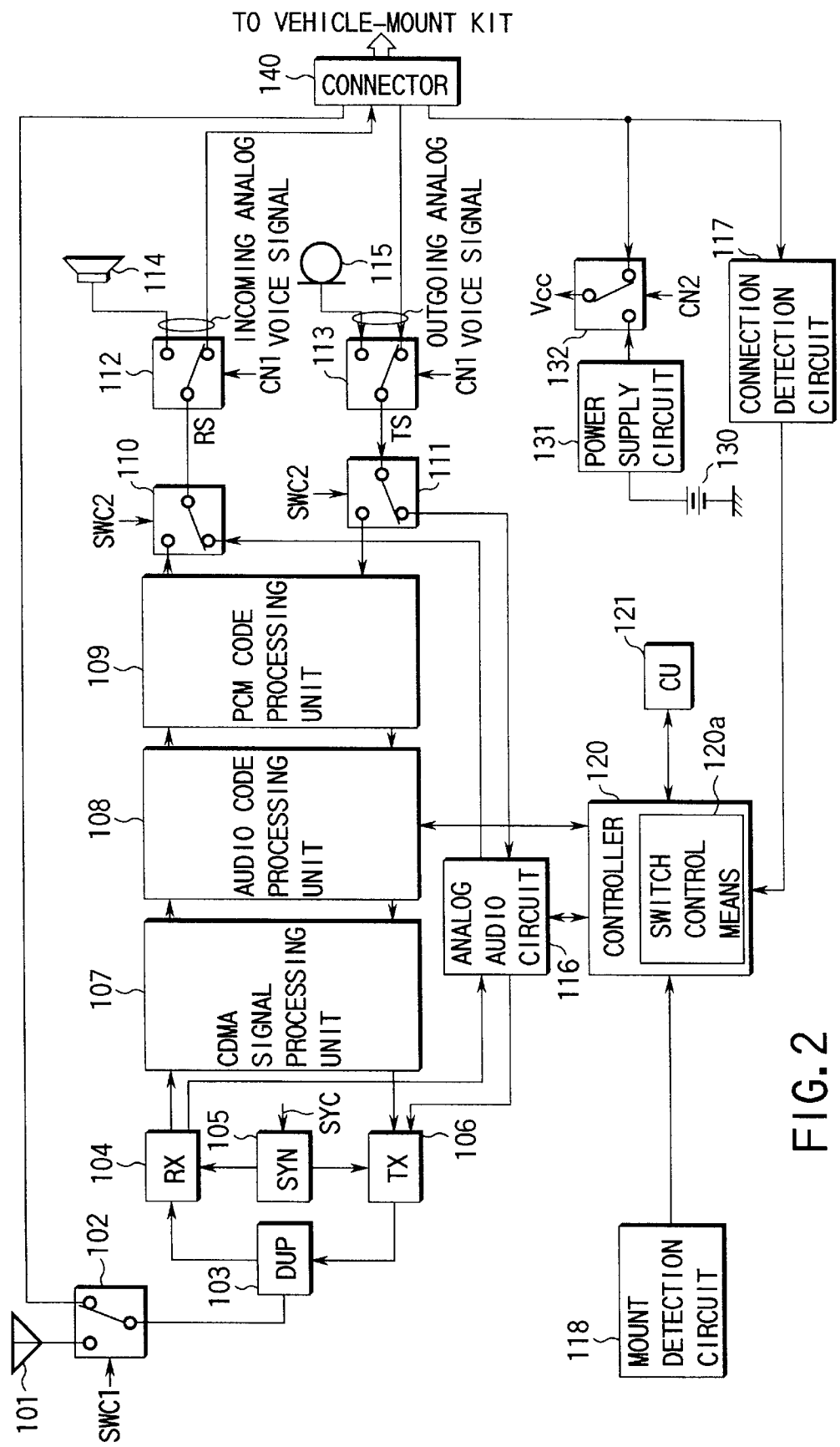
FIG. 2 is a block diagram showing the arrangement of a dual-mode radio communication apparatus according to the first embodiment of the present invention.

FIG. 2 shows the arrangement of a dual-mode radio communication apparatus according to the first embodiment of the present invention. The dual-mode radio communication apparatus shown in FIG. 2 is capable of communications by selecting one of two communication modes, i.e., an analog mode and a CDMA (Code Division Multiple Access) digital mode.

A connector 140 is used for connecting the dual-mode radio communication apparatus to a vehicle-mount kit (not shown). With this connection, a transmission RF signal, incoming analog voice signal, and the like are output to the vehicle-mount kit, and a reception RF signal, outgoing analog voice signal, power supply voltage, and the like are input from the vehicle-mount kit.

Figure 10:
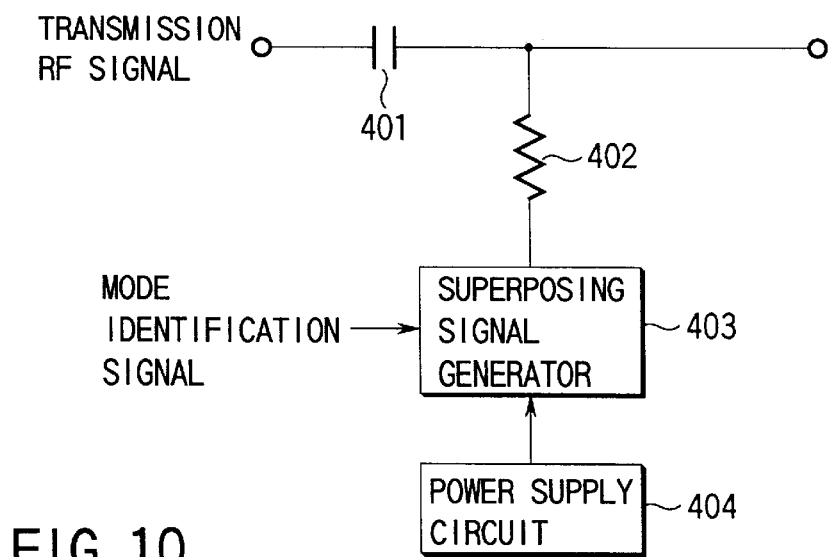
FIG. 10 is a block diagram showing the arrangement of a superposing circuit which is applied to the second to fourth embodiments.

A mode identification signal indicating the type (analog mode/digital mode) of communication mode is output from a controller 120, as will be described in detail later with reference to FIG. 10, is superposed on a transmission RF signal by a superposing circuit (not shown) inserted immediately after the output of a transmission circuit 106, and is then sent to the vehicle-mount kit.

A state wherein the digital mode is set will be explained first. A switching circuit 102 is switched to the side of an antenna 101 in accordance with a switching control signal SWC1 output from the controller 120, and switching circuits 110 and 111 are switched to the side of a PCM code processing unit 109 in accordance with a switching control signal SWC2 output from the controller 120.

In this state, an RF signal transmitted from a base station (not shown) via a digital voice channel is received by the antenna 101, and is then input to a reception circuit (RX) 104 via the switching circuit 102 and duplexer (DUP) 103.

In the reception circuit 104, the received RF signal is mixed with a reception local oscillation signal output from a frequency synthesizer (SYN) 105 to be frequency-converted into an IF signal. Note that the frequency of the reception local oscillation signal generated by the frequency synthesizer 105 is designated by a control signal SYC output from the controller 120.

The received IF signal is subjected to quadrature demodulation and then despread in a CDMA signal processing unit 107, thus extracting reception data addressed to the own station. The extracted reception data is expanded by an audio code processing unit 108 to be converted into an incoming digital voice signal.

The incoming digital voice signal is decoded to an incoming analog voice signal by the PCM code processing unit 109. This incoming analog voice signal is input to a switching circuit 112 via the switching circuit 110.

The switching circuit 112 is switched by a switching control signal CN1 output from the controller 120, and outputs the incoming analog voice signal to a loudspeaker 114 or the vehicle-mount kit (not shown) via the connector 140. The incoming analog voice signal output to the loudspeaker 114 is amplified by an amplifier (not shown), and is then output from the loudspeaker 114.

On the other hand, an outgoing voice signal of a speaker input from a microphone 115 or the vehicle-mount kit via the connector 140 is amplified by an amplifier (not shown), and is then input to a switching circuit 113 as an outgoing analog voice signal.

The switching circuit 113 is switched by a switching control signal CN1 output from the controller 120, and inputs an outgoing analog voice signal input from one of the microphone 115 and connector 140 to the switching circuit 111. The outgoing analog voice signal input to the switching circuit 111 is input to the PCM code processing unit 109.

The outgoing analog voice signal input to the PCM code processing unit 109 is PCM-encoded to be converted into an outgoing digital voice signal. The outgoing digital voice signal is compressed by the audio code processing unit 108, and is input to the CDMA signal processing unit 107 as transmission data.

The transmission data input to the CDMA signal processing unit 107 is spread using a PN code corresponding to a transmission channel, is subjected to quadrature modulation, and is input to the transmission circuit (TX) 106 as a quadrature modulation signal.

In the transmission circuit 106, the quadrature modulation signal is mixed with a transmission local oscillation signal to be converted into an RF signal, and the RF signal is RF-amplified. Note that the transmission local oscillation signal is output from the frequency synthesizer 105 in accordance with an instruction from the controller 120.

The transmission RF signal output from the transmission circuit 106 is supplied to the antenna 101 via the duplexer 103 and switching circuit 102, and is transmitted from the antenna 101 toward a base station (not shown).

On the other hand, when the analog mode is set, the switching circuits 110 and 111 are switched to the side of an analog audio circuit 116 in accordance with a switching control signal SWC2 output from the controller 120.

An RF signal transmitted from the base station (not shown) via an analog voice channel is received by the antenna 101 or an external antenna (not shown) connected to the vehicle-mount kit or booster unit via the connector 140, and is then input to the switching circuit 102.

The switching circuit 102 is switched by the switching control signal SWC1 output from the controller 120, and selectively connects one of the antenna 101 and connector 140 to the duplexer 103. As a result, the RF signal is input from the antenna 101 or connector 140 to the reception circuit 104 via the duplexer 103, and is frequency-converted into an IF signal in the reception circuit 104. The received IF signal output from the reception circuit 104 is input to the analog audio circuit 116.

The analog audio circuit 116 reconstructs an incoming analog voice signal from the received IF signal by FM demodulation. The incoming analog voice signal is input to the switching circuit 112 via the switching circuit 110.

The switching circuit 112 is switched by the switching control signal CN1 output from the controller 120, and outputs the incoming analog voice signal to the connector 140 or loudspeaker 114. The incoming analog voice signal output to the loudspeaker 114 is amplified by an amplifier (not shown) and is output from the loudspeaker 114.

On the other hand, an outgoing voice signal of a speaker input from the microphone 115 or connector 140 is amplified by an amplifier (not shown) and is then input to the switching circuit 113 as an outgoing analog voice signal.

The switching circuit 113 is switched by the switching control signal CN1 output from the controller 120, and inputs an outgoing analog voice signal input from one of the microphone 115 and connector 140 to the switching circuit 111.

The outgoing analog voice signal input to the switching circuit 111 is input to the analog audio circuit 116. The analog audio circuit 116 generates a signal which is FM-modulated in accordance with the outgoing voice signal, and the modulated signal is input to the transmission circuit 106.

In the transmission circuit 106, the modulated signal is mixed with a transmission local oscillation signal corresponding to the RF of an analog voice channel, which signal is generated by the frequency synthesizer 105, so as to be. up-converted into an RF signal. The RF signal is further RF-amplified to a predetermined output level.

The RF signal output from the transmission circuit 106 is input to the switching circuit 102 via the duplexer 103. The switching circuit 102 selectively outputs the RF signal to the antenna 101 or connector 140 in accordance with the switching control signal SWC1 from the controller 120.

A connection detection circuit 117 detects a connection with the vehicle-mount kit by detecting the power supply voltage supplied from the vehicle-mount kit side when the connector 140 is connected to the vehicle-mount kit. The circuit 117 supplies its detection result to the controller 120.

A mount detection circuit 118 detects if the dual-mode radio communication apparatus is mounted on the vehicle-mount kit, and supplies the detection result to the controller 120. Note that mount detection is done using, e.g., a microswitch, by detecting magnetism from a built-in magnet of the vehicle-mount kit, or the like.

The controller 120 uses, e.g., a microcomputer as a main control unit, and systematically controls the individual units of the dual-mode radio communication apparatus to attain radio connection control and conversation control. The controller 120 comprises a switch control means 120a as a new control function.

The switch control means 120a switches the switching circuits 102, 110, 111, 112, 113, and 132 in accordance with the current communication mode, and the detection results from the connection detection circuit 117 and mount detection circuit 118. FIG. 3 summarizes the switching control of the switch control means 120a.

The switch control means 120a switches the switching circuit 102 via the switching control signal SWC1. When the communication mode is the digital mode, the means 120a switches the switching circuit 102 to the antenna 101 side. On the other hand, when the communication mode is the analog mode, and the connector 140 is connected to the vehicle-mount kit, the means 120a switches the switching circuit 102 to the connector 140 side; when the connector 140 is not connected to the vehicle-mount kit, the means 120a switches the circuit 102 to the antenna 101 side.

The switch control means 120a switches the switching circuits 110 and 111 to be connected to the PCM code processing unit 109 side via the switching control signal SWC2 when the communication mode is the digital mode, or to be connected to the analog audio circuit 116 side when the communication mode is the analog mode.

The switch control means 120a switches the switching circuits 112 and 113 to the connector 140 side independently of the communication mode, when the connector 140 is connected to the vehicle-mount kit, and the dual-mode radio communication apparatus is mounted on the vehicle-mount kit. Otherwise, the means 120a respectively switches the switching circuit 112 and 113 to the sides of the loudspeaker 114. and microphone 115.

The switch control means 120a switches the switching circuit 132 to the connector 140 side via a switching control signal CN2 independently of the communication mode when the connector 140 is connected to the vehicle-mount kit. When the connector 140 is not connected to the vehicle-mount kit, the means 120a switches the switching circuit 132 to the side of a power supply circuit 131.

A console unit (CU) 121 has a key group including a dial key, call key, end key, volume key, mode key, and the like, and an LCD display for displaying the telephone number of a partner terminal, the operation state of the apparatus, and the like.

The power supply circuit 131 generates a predetermined operation power supply voltage Vcc on the basis of the output from a battery 130, and supplies it to the switching circuit 132. The switching circuit 132 is switched by the switching control signal CN2, as described above, and supplies the operation power supply voltage Vcc generated by the power supply circuit 131 or an operation power supply voltage Vcc supplied from the vehicle-mount kit via the connector 140 to the respective circuits of the dual-mode radio communication apparatus.

The operation of the dual-mode radio communication apparatus with the above arrangement will be explained below.

A case will be explained below wherein the user operates the console unit 121 to select the analog mode as the communication mode and uses the apparatus without connecting the connector 140 to the vehicle-mount kit, i.e., the user uses the dual-mode radio communication apparatus alone in the analog mode.

In this case, the connection detection circuit. 117 detects that the vehicle-mount kit is not connected to the connector 140, and supplies that detection result to the controller 120.

In response to this result, the switch control means 120a switches the switching circuits 110 and 111 to the analog audio circuit 116 side since the analog mode is selected, and switches the switching circuit 102 to the antenna 101 side since it is not informed of connection to the vehicle-mount kit. Also, the switch control means 120a respectively switches the switching circuit 112, 113, and 132 to the loudspeaker 114, microphone 115, and power supply circuit 131 side via switching control signals CN.

In this manner, when the dual-mode radio communication apparatus alone is used in the analog mode, it communicates with the base station using the built-in antenna 101, and the two parties can talk via the loudspeaker 114 and microphone 115.

On the other hand, when the apparatus is used in the analog mode while the connector 140 is connected to the vehicle-mount kit, the connection detection circuit 117 detects this state, and informs the controller 120 of connector connection.

In response to this information, the switch control means 120a switches the switching circuit 102 to the connector 140 side since the apparatus is used in the analog mode and it is informed of connection to the vehicle-mount kit, and also switches the switching circuit 132 to the connector 140 side.

Furthermore, when the dual-mode radio communication apparatus is mounted on the vehicle-mount kit, the mount detection circuit 118 detects this state, and informs the controller 120 to that effect. -In response to this information, the switch control means 120a switches the switching circuits 112 and 113 to the connector 140 side.

In this fashion, when the dual-mode radio communication apparatus is used in the analog mode as it is connected to the vehicle-mount kit, it communicates with the base station using an external antenna connected via the connector 140, vehicle-mount kit, and booster unit, in place of the built-in antenna 101.

Furthermore, when the dual-mode radio communication apparatus is mounted on the vehicle-mount kit, the party can talk with hands free using a built-in loudspeaker and microphone of the vehicle-mount kit.

A case will be explained below wherein the user operates the console unit 121 to select the digital mode as the communication mode and uses the apparatus without connecting the connector 140 to the vehicle-mount kit, i.e., the user uses the dual-mode radio communication apparatus alone in the digital mode.

In such case, the connection detection circuit 117 detects that the vehicle-mount kit is not connected to the connector 140, and supplies that detection result to the controller 120.

In response to this information, the switch control means 120a switches the switching circuit 102 to the antenna 101 side, and also the switching circuits 110 and 111 to the PCM code processing unit 109 side since the digital mode is selected.

Since connection to the vehicle-mount kit is not detected, the switch control means 120a switches the switching circuits 112, 113, and 132 to the sides of the loudspeaker 114, microphone 115, and power supply circuit 131, respectively.

In this manner, when the dual-mode radio communication apparatus alone is used in the digital mode, it communicates with the base station using the built-in antenna 101, and the party can talk using the loudspeaker 114 and microphone 115.

On the other hand, when the user uses the apparatus in the digital mode while connecting the connector 140 to the vehicle-mount kit, the connection detection circuit 117 detects this state, and informs the controller 120 of that detection result.

In response to this information, the switch control means 120a switches the switching circuit 102 to the antenna 101 side since the digital mode is selected, and also switches the switching circuit 132 to the connector 140 side since connection to the vehicle-mount kit is detected.

Furthermore, when the dual-mode radio communication apparatus is mounted on the vehicle-mount kit, the mount detection circuit 118 detects this state, and supplies that result to the controller 120. In response to this, the switch control means 120a switches the switching circuits 112 and 113 to the connector 140 side.

In this way, when the dual-mode radio communication apparatus is used in the digital mode as it is connected to the vehicle-mount kit, it communicates with the base station using the built-in antenna 101, and a power supply voltage is supplied from the vehicle-mount kit via the connector 140.

Moreover, when the dual-mode radio communication apparatus is mounted on the vehicle-mount kit, the party can talk with hands free using the built-in loudspeaker and microphone of the vehicle-mount kit.

As described above, when the dual-mode radio communication apparatus with the above arrangement is not connected to the vehicle-mount kit in the analog mode, a communication with the base station is made using the built-in antenna 101; when it is connected to the vehicle-mount kit, a communication with the base station is made using the external antenna via the vehicle-mount kit and booster unit. In the digital mode, a communication with the base station is made via the built-in antenna 101 independently of connection with the vehicle-mount kit.

Therefore, according to the dual-mode radio communication apparatus with the above arrangement, even when the apparatus is connected to the booster unit, communications can be made in the analog mode while amplifying transmission/reception signals. Also, in the digital mode, communications are made using the built-in antenna. For this reason, even when the communication mode is switched from the analog mode to the digital mode, communications can be made while the apparatus is kept connected to the booster unit.

In general, since the CDMA scheme can assign a larger number of communication channels than the analog scheme if the bandwidth remains the same, it is mainly used in urban areas. On the other hand, the analog scheme which has prevailed prior to the advent of CDMA is used not only in urban areas but also in suburban areas that do not require many channels.

By contrast, the dual-mode radio communication apparatus with the above arrangement can be used in suburban areas with a low density of base stations by amplifying an RF signal using a booster unit. Even when the user moves to an urban area while the apparatus is kept connected to the booster unit, he or she can use the apparatus by CDMA. When the apparatus is used by CDMA, the RF signal is not amplified, but the apparatus can be used since the density of base stations is high in urban areas.

A vehicle-mount kit according to the second embodiment of the present invention will be explained below.

This vehicle-mount kit supplies a power supply voltage from a car battery to a dual-mode radio communication apparatus, allows a hand-free conversation, and relays the connection between the dual-mode radio communication apparatus and a booster unit.

Figure 4:
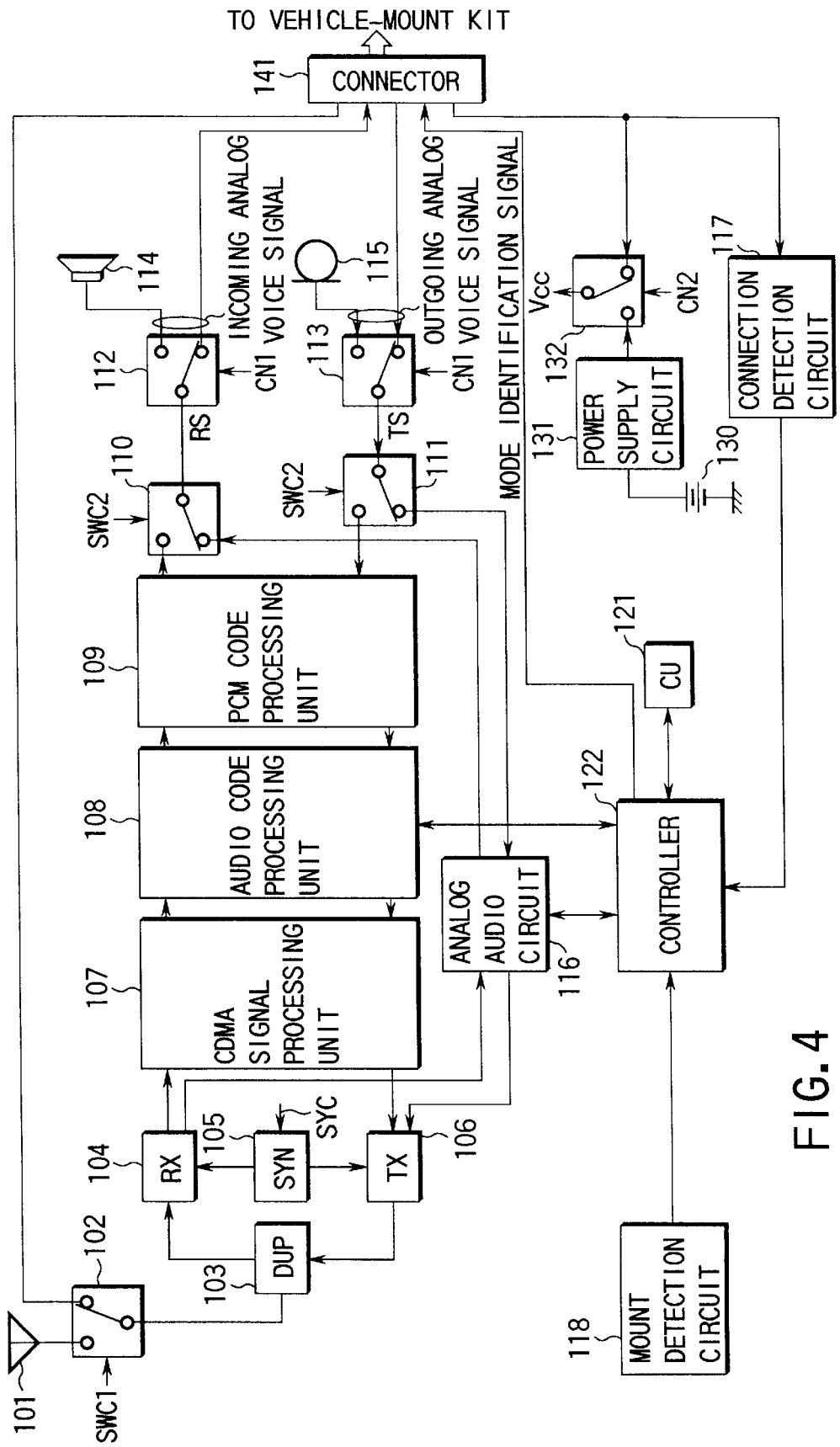
FIG. 4 is a block diagram showing the arrangement of a dual-mode radio communication apparatus connected to a vehicle-mount kit according to the second embodiment of the present invention.

Prior to the description of the vehicle-mount kit, the dual-mode radio communication apparatus connected to this vehicle-mount kit will be explained. FIG. 4 shows the arrangement of the dual-mode radio communication apparatus.

The dual-mode radio communication apparatus shown in FIG. 4 is capable of communications by selecting one of two communication modes, i.e., an analog mode and a CDMA (Code Division Multiple Access) digital mode.

A connector 141 is used for connecting the dual-mode radio communication apparatus to a vehicle-mount kit (to be described later). With this connection, a transmission RF signal, incoming analog voice signal, mode identification signal, and the like are output to the vehicle-mount kit, and a reception RF signal, outgoing analog voice signal, power supply voltage, and the like are input from the vehicle-mount kit.

A connection detection circuit 117 detects a connection with the vehicle-mount kit by detecting the power supply voltage supplied from the vehicle-mount kit side when the connector 141 is connected to the vehicle-mount kit. The circuit 117 supplies its detection result to a controller 122.

A mount detection circuit 118 detects if the dual-mode radio communication apparatus is mounted on the vehicle-mount kit, and supplies the detection result to the controller 122. Note that mount detection is done using, e.g., a microswitch, by detecting magnetism from a built-in magnet of the vehicle-mount kit, or the like.

The controller 122 uses, e.g., a microcomputer as a main control unit, and systematically controls the individual units of the dual-mode communication apparatus to attain radio connection control, conversation control, and the like.

The controller 122 switches switching circuits 102, 110, 111, 112, 113, and 132 in accordance with the selected communication mode, and the detection results of the connection detection circuit 117 and mount detection circuit 118.

The controller 122 switches the switching circuit 102 via a switching control signal SWC1. In this switching control, when it is determined based on the result from the connection detection circuit 117 that the connector 141 is connected to the vehicle-mount kit, a duplexer (DUP) 103 is connected to the connector 141; when it is determined that the connector 141 is not connected to the vehicle-mount kit, the duplexer 103 to an antenna 101.

The controller 122 switches the switching circuits 110 and 111 to be connected to the side of a PCM code processing unit 109 via a switching control signal SWC2 when the communication mode is the digital mode, or switches them to be connected to the side of an analog audio circuit 116 when the communication mode is the analog mode.

The controller 122 switches the switching circuits 112 and 113 to the connector 141 side, when the connector 141 is connected to the vehicle-mount kit and the dual-mode radio communication apparatus is mounted on the vehicle-mount kit. Otherwise, the controller 121 switches these switching circuits respectively to the sides of a loudspeaker 114 and microphone 115 via a switching control signal CN1.

The controller 122 switches the switching circuit 132 to the side of a power supply circuit 131 via a switching control signal CN2 when the connector 141 is not connected to the vehicle-mount kit. When the connector 141 is connected to the vehicle-mount kit, the controller 122 switches the switching circuit 132 to the connector 141 side.

A case will be explained first wherein the digital mode is selected as the communication mode. In such case, the switching circuits 110 and 111 are switched to the PCM code processing unit 109 side in accordance with the switching control signal SWC2 from the controller 122.

In this state, an RF signal transmitted from a base station (not shown) via a digital voice channel is received by the antenna 101 or an external antenna (not shown) connected to the vehicle-mount kit or a booster unit via the connector 141, and is then input to the switching circuit 102.

The switching circuit 102 is switched by the switching control signal SWC1 from the controller 122, and selectively connects one of the antenna 101 and connector 141 to the duplexer 103. With this control, the RF signal from the antenna 101 or connector 141 is input to a reception circuit (RX) 104 via the duplexer 103.

In the reception circuit 104, the received RF signal is mixed with a reception local oscillation signal output from a frequency synthesizer (SYN) 105 to be frequency-converted into an IF signal. Note that the frequency of the reception local oscillation signal generated by the frequency synthesizer 105 is designated by a control signal SYC output from the controller 122.

The received IF signal is subjected to quadrature demodulation and then despread in a CDMA signal processing unit 107, thus extracting reception data addressed to the own station. The extracted reception data is expanded by an audio code processing unit 108 to be converted into an incoming digital voice signal.

The incoming digital voice signal is decoded to an incoming analog voice signal by the PCM code processing unit 109. This incoming analog voice signal is input to the switching circuit 112 via the switching circuit 110.

The switching circuit 112 is switched by the switching control signal CN1 output from the controller 122, and outputs the incoming analog voice signal to the loudspeaker 114 or the vehicle-mount kit (not shown) via the connector 141. The incoming analog voice signal output to the loudspeaker 114 is amplified by an amplifier (not shown), and is then output from the loudspeaker 114.

On the other hand, an outgoing voice signal of a speaker input from the microphone 115 or the vehicle-mount kit via the connector 141 is amplified by an amplifier (not shown), and is then input to the switching circuit 113 as an outgoing analog voice signal.

The switching circuit 113 is switched by the switching control signal CN1 output from the controller 122, and inputs an outgoing analog voice signal input from one of the microphone 115 and connector 141 to the switching circuit 111. The outgoing analog voice signal input to the switching circuit 111 is input to the PCM code processing unit 109.

The outgoing analog voice signal input to the PCM code processing unit 109 is PCM-encoded to be converted into an outgoing digital voice signal. The outgoing digital voice signal is compressed by the audio code processing unit 108, and is input to the CDMA signal processing unit 107 as transmission data.

The transmission data input to the CDMA signal processing unit 107 is spread using a PN code corresponding to a transmission channel, is subjected to quadrature modulation, and is input to a transmission circuit (TX) 106 as a quadrature modulation signal.

In the transmission circuit 106, the quadrature modulation signal is mixed with a transmission local oscillation signal to be converted into an RF signal, and the RF signal is RF-amplified. Note that the transmission local oscillation signal is output from the frequency synthesizer 105 in accordance with an instruction from the controller 122.

The transmission RF signal output from the transmission circuit 106 is input to the antenna 101 or connector 141 via the duplexer 103 and switching circuit 102.

On the other hand, when the analog mode is set as the communication mode, the switching circuits 110 and 111 are switched to the analog audio circuit 116 side in accordance with the switching control signal SWC2 output from the controller 122.

An RF signal transmitted from the base station (not shown) via an analog voice channel is received by the antenna 101 or an external antenna (not shown) connected to the vehicle-mount kit or booster unit via the connector 141, and is then input to the switching circuit 102.

The switching circuit 102 is switched by the switching control signal SWC1 output from the controller 122, and selectively connects one of the antenna 101 and connector 141 to the duplexer 103.

As a result, the RF signal is input from the antenna 101 or connector 141 to the reception circuit 104 via the duplexer 103, and is frequency-converted into an IF signal in the reception circuit 104. The received IF signal output from the reception circuit 104 is input to the analog audio circuit 116.

The analog audio circuit 116 reconstructs an incoming analog voice signal from the received IF signal by FM demodulation. The incoming analog voice signal is input to the switching circuit 112 via the switching circuit 110.

The switching circuit 112 is switched by the switching control signal CN1 output from the controller 122, and outputs the incoming analog voice signal to the connector 141 or loudspeaker 114. The incoming analog voice signal output to the loudspeaker 114 is amplified by an amplifier (not shown) and is output from the loudspeaker 114.

On the other hand, an outgoing voice signal of a speaker input from the microphone 115 or connector 141 is amplified by an amplifier (not shown) and is then input to the switching circuit 113 as an outgoing analog voice signal.

The switching circuit 113 is switched by the switching control signal CN1 output from the controller 122, and inputs an outgoing analog voice signal input from one of the microphone 115 and connector 141 to the switching circuit 111.

The outgoing analog voice signal input to the switching circuit 111 is input to the analog audio circuit 116. The analog audio circuit 116 generates a signal which is FM-modulated in accordance with the outgoing voice signal, and the modulated signal is input to the transmission circuit 106.

In the transmission circuit 106, the modulated signal is mixed with a transmission local oscillation signal corresponding to the RF of an analog voice channel, which signal is generated by the frequency synthesizer 105, so as to be up-converted into an RF signal. The RF signal is further RF-amplified to a predetermined output level.

The RF signal output from the transmission circuit 106 is input to the switching circuit 102 via the duplexer 103. The switching circuit 102 selectively outputs the RF signal to the antenna 101 or connector 141 in accordance with the switching control signal SWC1 from the controller 122.

A console unit (CU) 121 has a key group including a dial key, call key, end key, volume key, mode key, and the like, and an LCD display for displaying the telephone number of a partner terminal, the operation state of the apparatus, and the like.

The power supply circuit 131 generates a predetermined operation power supply voltage Vcc on the basis of the output from a battery 130, and supplies it to the switching circuit 132. The switching circuit 132 is switched by the switching control signal CN2, as described above, and supplies the operation power supply voltage Vcc generated by the power supply circuit 131 or an operation power supply voltage Vcc supplied from the vehicle-mount kit via the connector 141 to the respective circuits of the dual-mode radio communication apparatus.

Figure 5:
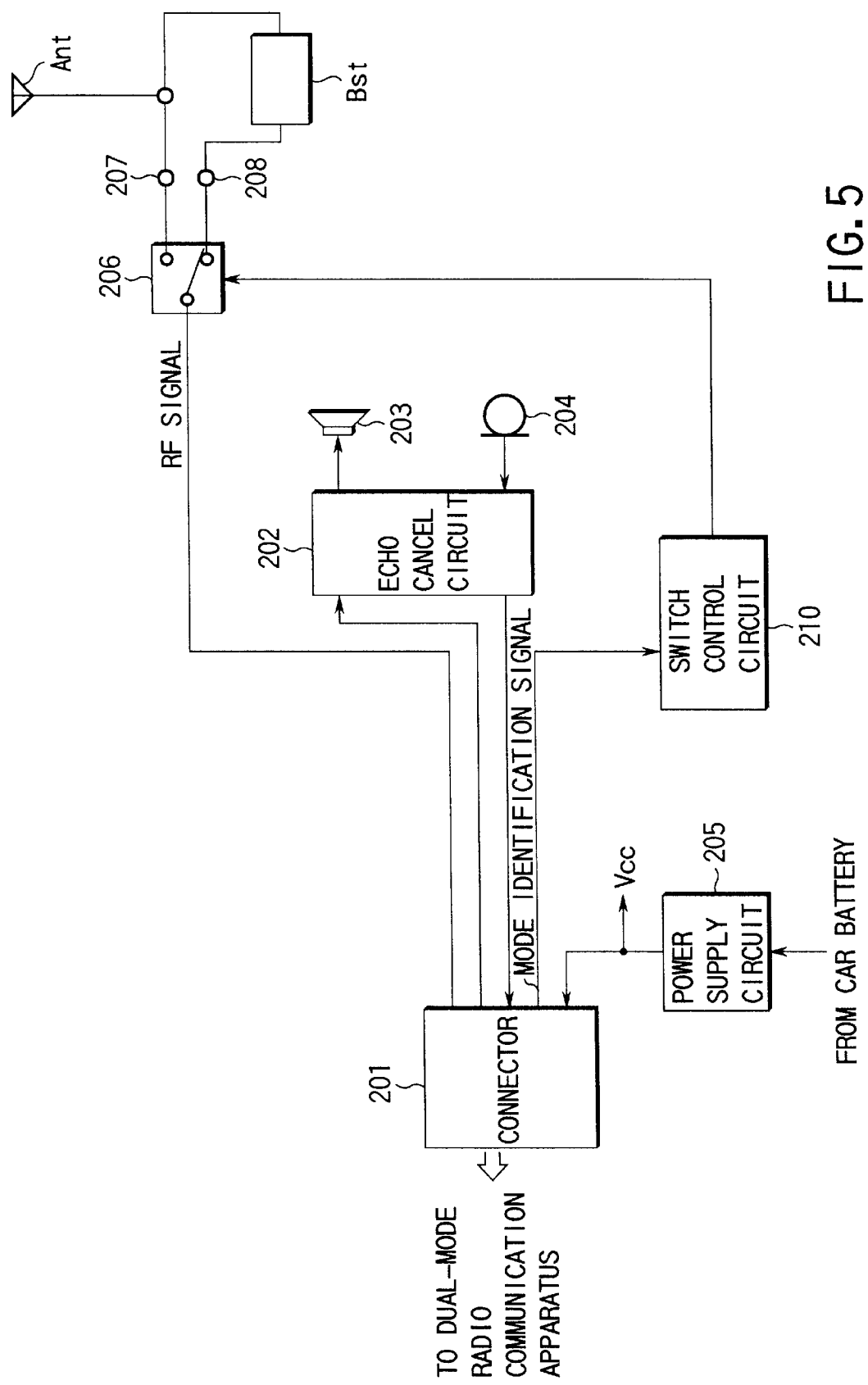
FIG. 5 is a block diagram showing the arrangement of the vehicle-mount kit according to the second embodiment of the present invention.

The vehicle-mount kit according to the second embodiment of the present invention will be described below. FIG. 5 is a block diagram showing a state wherein a booster unit Bst to be connected to an external antenna Ant is connected to this vehicle-mount kit, and that external antenna Ant is directly connected to the kit.

A connector 201 is used for connecting the vehicle-mount kit to the aforementioned dual-mode radio communication apparatus. By connecting the connector 201 to the above-mentioned connector 141, a transmission RF signal, incoming analog voice signal, mode identification signal, and the like are input from the dual-mode radio communication apparatus, and a reception RF signal, outgoing analog voice signal, power supply voltage, and the like are output to the dual-mode radio communication apparatus.

An incoming analog voice signal input via the connector 201 is input to an echo cancel circuit 202. The echo cancel circuit 202 estimates the characteristics of the acoustic echo path between a loudspeaker 203 and microphone 204, and generates a pseudo acoustic echo from information representing the estimated characteristics of the acoustic echo path, and the incoming analog voice signal.

By subtracting the pseudo acoustic echo from an outgoing analog voice signal input from the microphone 204, the circuit 202 removes the acoustic echo produced by roundabout of an incoming voice signal tone from the loudspeaker 203 to the microphone 204. The outgoing analog voice signal, from which the acoustic echo has been removed by the echo cancel circuit 202, is input to the dual-mode radio communication apparatus via the connector 201.

A power supply circuit 205 generates a predetermined operation power supply voltage Vcc on the basis of the output from a battery (not shown) mounted on a vehicle, and inputs it to the dual-mode radio communication apparatus via the connector 201.

A switching circuit 206 has a first terminal connected to an antenna connection terminal 207 for connecting the external antenna Ant, and a second terminal connected to an antenna connection terminal 208 for connecting the booster unit Bst. In accordance with a switching control signal output from a switch control circuit 210 (to be described below), the circuit 206 selectively connects one of the first and second terminals to the connector 201.

The switch control circuit 210 switches the switching circuit 206 in accordance with a mode identification signal input from the dual-mode radio communication apparatus via the connector 201. In this switching control, when the mode identification signal indicates the digital mode, the circuit 210 connects the connector 201 to the antenna connection terminal 207; when the mode identification signal indicates the analog mode, it connects the connector 201 to the antenna connection terminal 208.

The operation of the vehicle-mount kit with the above arrangement will be explained below.

When the user connects the connector 141 of the dual-mode radio communication apparatus to the connector 201 of the vehicle-mount kit and operates the console unit 121 to select the digital mode as the communication mode, the controller 122 of the dual-mode radio communication apparatus informs the vehicle-mount kit via the mode identification signal that the digital mode has been selected as the communication mode.

In the vehicle-mount kit, the mode identification signal is input to the switch control circuit 210 to inform it that the digital mode has been selected. Then, the switch control circuit 210 switches the switching circuit 206 to connect the antenna connection terminal 207 and connector 201.

With this switching control, the dual-mode radio communication apparatus communicates with the base station in the digital mode using the external antenna Ant connected to the antenna connection terminal 207 of the vehicle-mount kit.

On the other hand, when the user selects the analog mode as the communication mode by operating the console unit 121, the controller 122 of the dual-mode radio communication apparatus informs the vehicle-mount kit via the mode identification signal that the analog mode has been selected as the communication mode.

In the vehicle-mount kit, the mode identification signal is input to the switch control circuit 210 to inform it that the analog mode has been selected. Then, the switch control circuit 210 switches the switching circuit 206 to connect the antenna connection terminal 208 and connector 201.

With this switching control, the dual-mode radio communication apparatus communicates with the base station in the analog mode using the booster unit Bst connected to the antenna connection terminal 208 of the vehicle-mount kit and the external antenna Ant connected to this unit.

As described above, in the vehicle-mount kit with the above arrangement when the communication mode of the dual-mode radio communication apparatus connected is the analog mode, the dual-mode radio communication apparatus is electrically connected to the booster unit Bst. On the other hand, when the communication mode is the digital mode, the dual-mode radio communication apparatus is directly electrically connected to the external antenna Ant.

Therefore, according to the vehicle-mount kit with the above arrangement, when the dual-mode radio communication apparatus is used in the analog mode while the dual-mode radio communication apparatus is connected to the booster unit Bst which is compatible with only the analog mode, the dual-mode radio communication apparatus communicates by amplifying an RF signal via the booster unit Bst.

Also, even when the dual-mode radio communication apparatus is switched from the analog mode to the digital mode or the dual-mode radio communication apparatus set in the digital mode is connected to the vehicle-mount kit, communications can be made.

In this embodiment, the external antenna Ant connected to the booster unit Bst is commonly used as that connected to the antenna connection terminal 207. Alternatively, another external antenna different from the external antenna Ant of the booster unit Bst may be connected to the antenna connection terminal 207.

A booster unit according to the third embodiment of the present invention will be described below.

Figure 7:
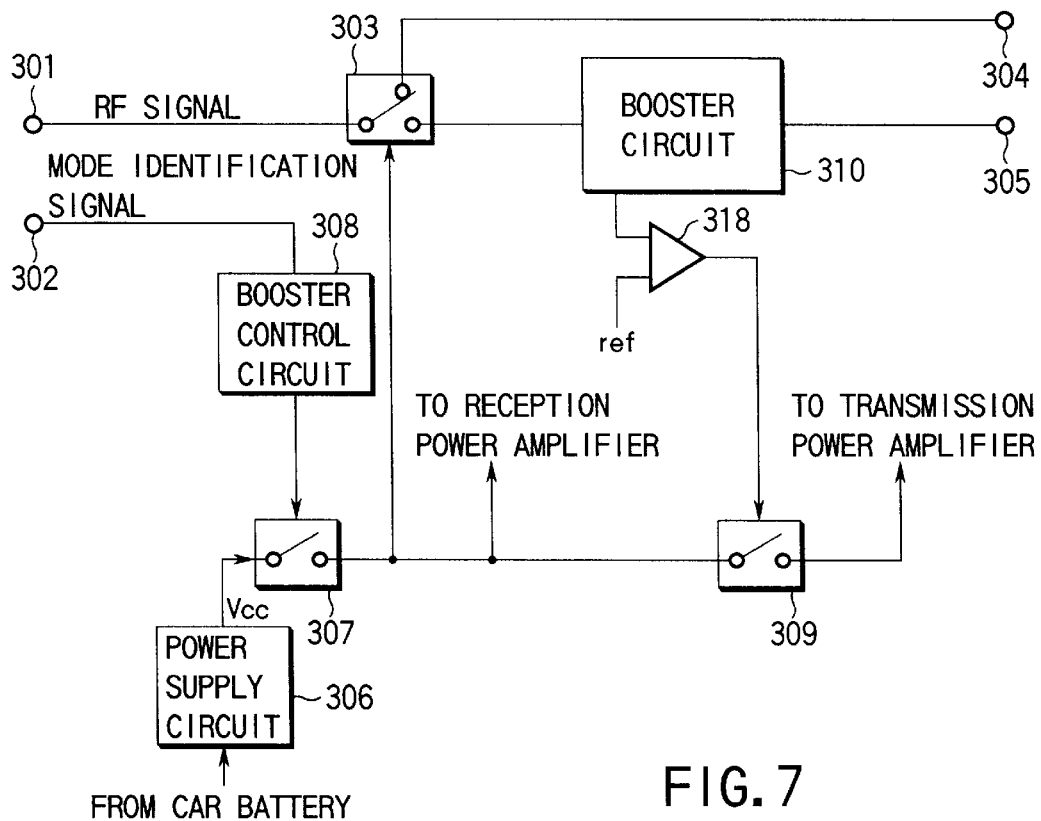
FIG. 7 is a block diagram showing the arrangement of the booster unit according to the third embodiment of the present invention.

FIG. 7 shows the arrangement of the booster unit.

Figure 6:
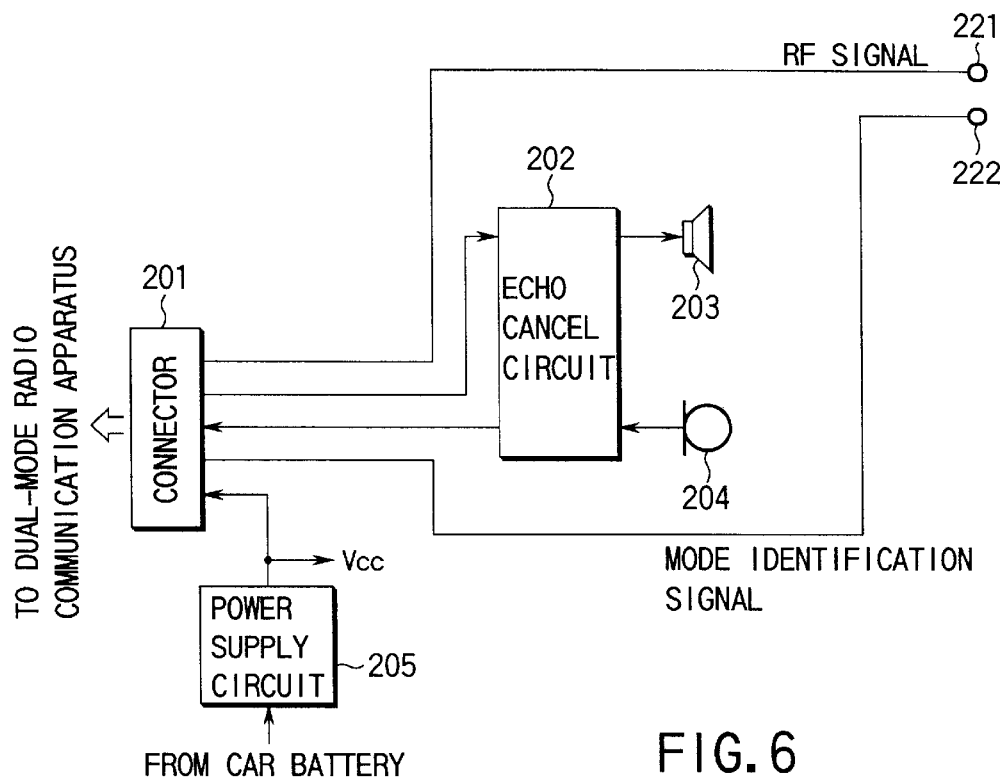
FIG. 6 is a block diagram showing the arrangement of a vehicle-mount kit connected to a booster unit according to the third embodiment of the present invention.

The booster unit shown in FIG. 7 is connected to a dual-mode radio communication apparatus via a vehicle-mount kit shown in FIG. 6, and amplifies an RF signal communicated between this dual-mode radio communication apparatus and a base station as needed.

Note that the dual-mode radio communication apparatus used in this embodiment is the same as that described in the second embodiment, and inputs a mode identification signal indicating the communication mode to the booster unit via the vehicle-mount kit.

Prior to the description of the booster unit shown in FIG. 7, the vehicle-mount kit shown in FIG. 6 will be explained. The vehicle-mount kit shown in FIG. 6 is connected to the dual-mode radio communication apparatus via a connector 201, realizes a hand-free conversation by an echo cancel circuit 202, loudspeaker 203, and microphone 204, and supplies a power supply voltage Vcc from a power supply circuit 205 to the dual-mode radio communication apparatus, as in the vehicle-mount kit shown in FIG. 5.

This vehicle-mount kit outputs the mode identification signal input via the connector 201 to the booster unit via a connection terminal 221. Also, the kit inputs/outputs an RF signal input/output to/from the dual-mode radio communication apparatus via the connector 201 to/from the booster unit via a connection terminal 222 independently of the current communication mode.

The booster unit shown in FIG. 7 comprises an RF signal input/output terminal 301, which is connected to the connection terminal 221 of the aforementioned vehicle-mount kit to input/output an RF signal, and an input terminal 302, which is connected to the connection terminal 222 of the vehicle-mount kit to receive the mode identification signal.

The RF signal input/output terminal 301 is selectively connected by a switching circuit 303 to a first antenna connection terminal 304 or a second antenna connection terminal 305 via a booster circuit 310. The first antenna connection terminal 304 is connected to a first external antenna (not shown), and the second antenna connection terminal 305 is connected to a second external antenna (not shown).

The switching circuit 303 is switched by the output from a switching circuit 307 (to be described later), and connects the RF signal input/output terminal 301 and first antenna connection terminal 304 in the initial state.

Figure 8:
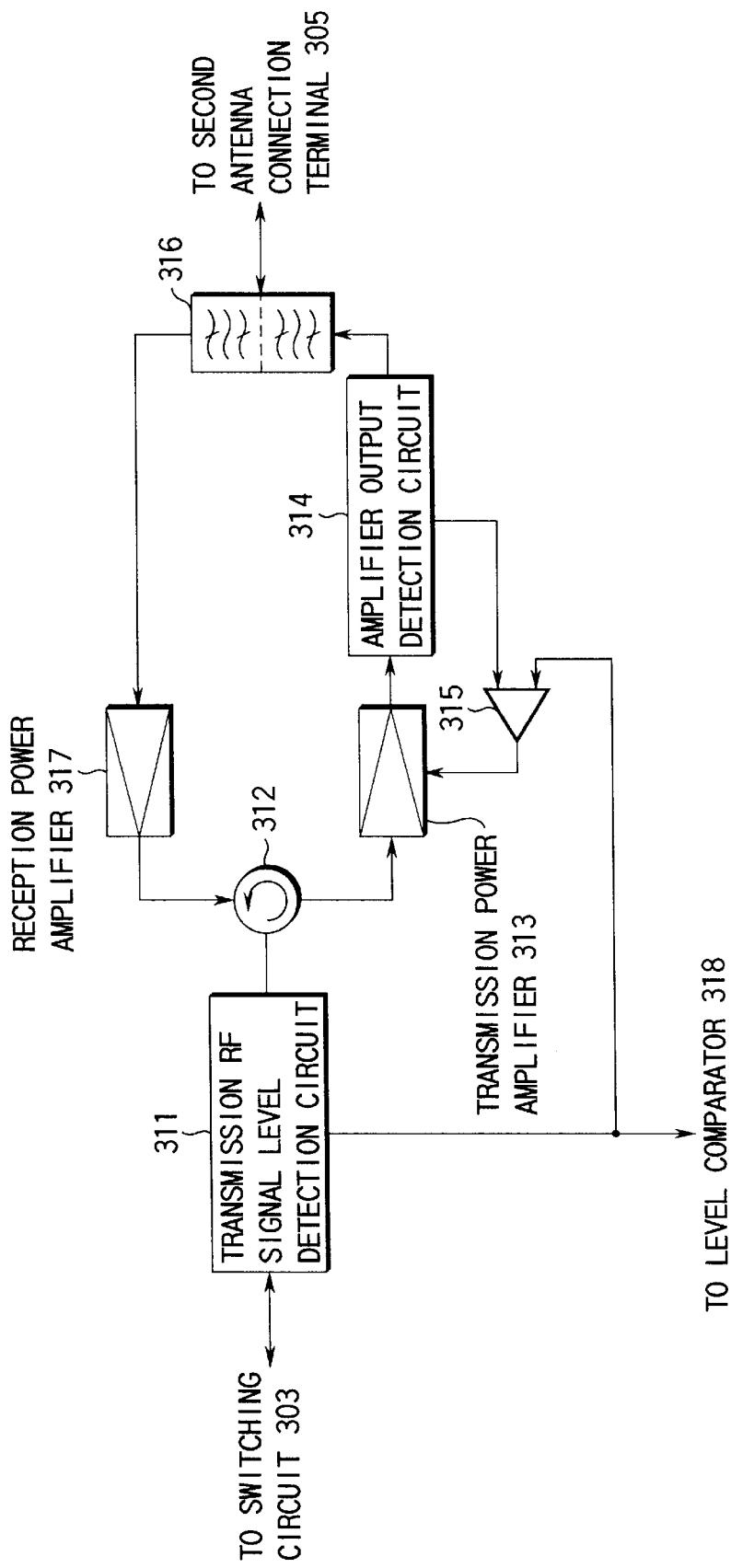
FIG. 8 is a block diagram showing an example of the arrangement of a booster circuit of the booster unit shown in FIG. 7.

The booster circuit 310 amplifies an RF signal communicated with the base station via the second external antenna, and has an arrangement shown in, e.g., FIG. 8.

A transmission RF signal input via the RF signal input/output terminal 301 and switching circuit 303 is input to a transmission RF signal level detection circuit 311.

The transmission RF signal level detection circuit 311 detects the signal strength of the transmission RF signal, and outputs the detection result to the first input terminals of level comparators 315 and 318 (to be described later). Also, the transmission RF signal level detection circuit 311 inputs the input transmission RF signal to a transmission power amplifier 313 via a circulator 312.

The transmission power amplifier 313 amplifies the transmission RF signal input via the circulator 312 in accordance with the comparison result of the level comparator 315, and inputs the amplified signal to an amplifier output detection circuit 314.

The amplifier output detection circuit 314 detects the signal strength of the transmission RF signal amplified by the transmission power amplifier 313, and outputs the detection result to the second input terminal of the level comparator 315. Also, the amplifier output detection circuit 314 inputs the transmission RF signal received from the transmission power amplifier 313 to a band-pass filter 316.

The level comparator 315 compares the signal strengths input to its first and second input terminals, i.e., the signal strength of the transmission RF signal input to the booster unit and that of the transmission RF signal amplified by the transmission power amplifier 313, and supplies the comparison result to the transmission power amplifier 313. Based on this result, the transmission power amplifier 313 amplifies the transmission RF signal with a predetermined gain.

Signal components other than those in a predetermined bandwidth are removed from the transmission RF signal input to the band-pass filter 316, and only an RF signal within a desired band is input to the second antenna connection terminal 305. Then, the RF signal is radiated into the atmosphere by the second external antenna.

On the other hand, a received RF signal, which is received by the second external antenna and is input via the second antenna connection terminal 305, is input to the band-pass filter 316. Of the received RF signal, only an RF signal within a desired band passes through the band-pass filter 316, and is input to a reception power amplifier 317.

The reception power amplifier 317 amplifies the received RF signal with a preset gain. The amplifier 317 inputs the amplified received RF signal to the switching circuit 303 via the circulator 312 and transmission RF signal level detection circuit 311.

Referring back to FIG. 7, the booster unlit will be explained. A power supply circuit 306 generates a predetermined operation power supply voltage Vcc on the basis of the output from a battery (not shown) mounted on a vehicle, and supplies it to the switching circuit 307.

The switching circuit 307 is switched by a booster control circuit 308. The booster control circuit 308 switches the switching circuit 307 in accordance with the mode identification signal input to the input terminal 302. When the mode identification signal indicates the digital mode, the circuit 308 opens the switching circuit 307; when the mode identification signal indicates the analog mode, it short-circuits the switching circuit 307.

With this switching control, the switching circuit 307 supplies the power supply voltage Vcc to the reception power amplifier 317 and also inputs it to a switching circuit 309 in the analog mode.

The power supply voltage Vcc that has passed through the switching circuit 307 in the analog mode is input to the switching circuit 303 as a switching control signal, thereby connecting the RF signal input/output terminal 301 and transmission RF signal level detection circuit 311.

The switching circuit 309 is switched by the comparison result of a level comparator 318 (to be described below).

The level comparator 318 compares the signal strength input to its first input terminal with a reference signal strength ref input to its second input terminal, i.e., the signal strength of a transmission RF signal input to the booster unit with the preset reference signal strength ref.

As a result of comparison, when the signal strength of the transmission RF signal is lower than the reference signal strength ref, the switching circuit 309 is short-circuited to supply the power supply voltage Vcc to the transmission power amplifier 313.

The operation of the booster unit with the above arrangement will be explained below.

The dual-mode radio communication apparatus is connected to the connector 201 of the vehicle-mount kit, and the connection terminals 221 and 222 of the vehicle-mount kit are respectively connected to the RF signal input/output terminal 301 and input terminal 302 of the booster unit.

In this state, when the user selects the digital mode as the communication mode, a controller of the dual-mode radio communication apparatus informs the booster unit via the vehicle-mount kit using the mode identification signal that the digital mode has been selected as the communication mode.

In response to this information, in the booster unit, when the mode identification signal is input to the booster control circuit 308 to inform it of the digital mode, the booster control circuit 308 opens the switching circuit 307.

As a consequence, in the booster unit, the power supply voltage Vcc is not supplied to the transmission power amplifier 313 and reception power amplifier 317, and the switching circuit 303 is maintained in the initial state, thus connecting the RF signal input/output terminal 301 to the first antenna connection terminal 304.

In this way, in the digital mode the dual-mode radio communication apparatus connected to the booster unit is connected to the first antenna connection terminal 304 of the booster unit, and communicates with a base station via the first external antenna.

On the other hand, when the user selects the analog mode as the communication mode, the controller of the dual-mode radio communication apparatus sends a message indicating this to the booster unit via the vehicle-mount kit.

In response to this message, in the booster unit, when the mode identification signal is input to the booster control circuit 308 to inform it that the analog mode has been selected, the booster control circuit 308 short-circuits the switching circuit 307.

Consequently, in the booster unit, the power supply voltage Vcc is supplied to the reception power amplifier 317, and is also input to the switching circuit 303 as a switching control signal. In accordance with this switching control signal, the switching circuit 303 connects the RF signal input/output terminal 301 and booster circuit 310.

Hence, the dual-mode radio communication apparatus connected to the booster unit communicates with the base station via the booster circuit 310 and the second external antenna connected to the second antenna connection terminal 305 of the booster unit in the analog mode.

As described above, when the communication mode of the dual-mode radio communication apparatus connected is the analog mode, the booster unit with the above arrangement connects the dual-mode radio communication apparatus to the second external antenna via the booster circuit 310. On the other hand, when the communication mode is the digital mode, the booster unit connects the dual-mode radio communication apparatus to the first external antenna without the intervention of the booster circuit.

Hence, according to the booster unit with the above arrangement, even when the dual-mode radio communication apparatus connected is switched from the analog mode to the digital mode or the dual-mode radio communication apparatus set in the digital mode is connected, the dual-mode radio communication apparatus can make normal communications.

Figure 9:
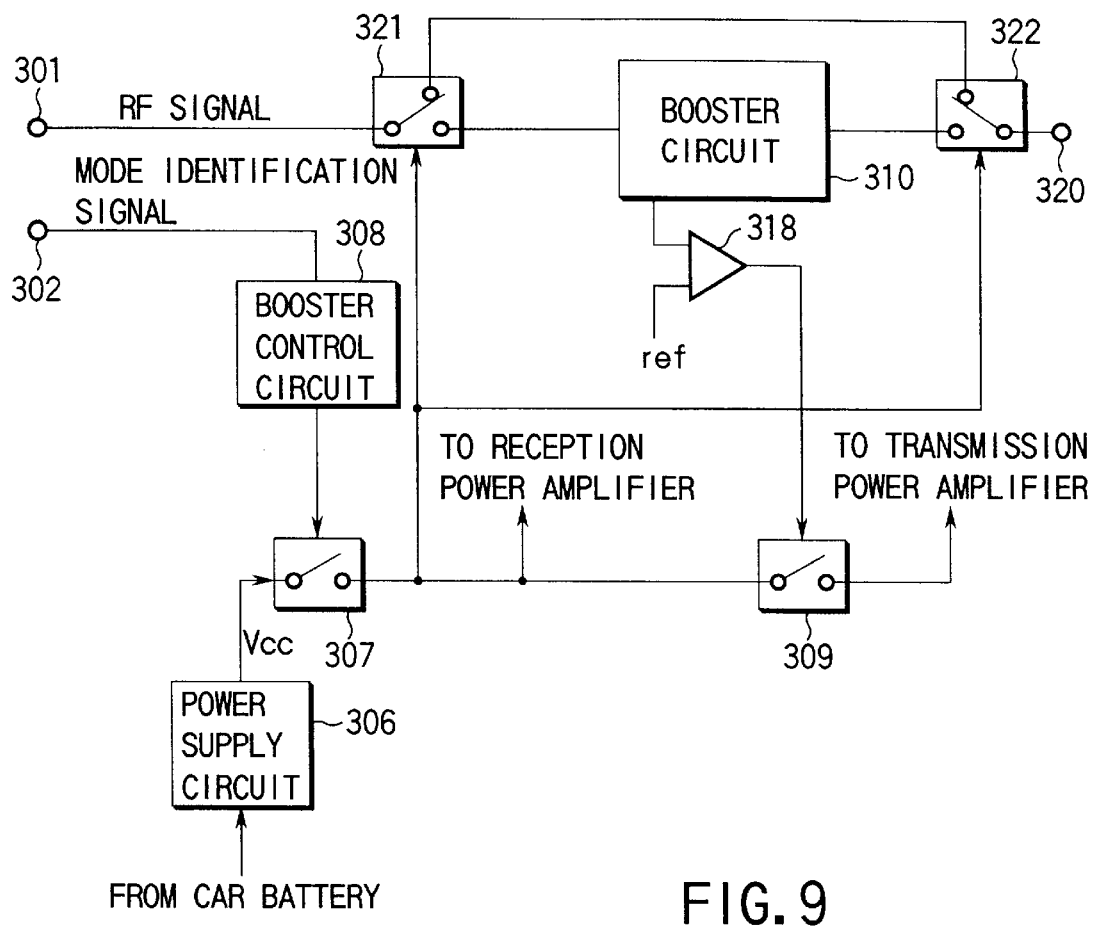
FIG. 9 is a block diagram showing the arrangement of a booster unit according to the fourth embodiment of the present invention.

A booster unit according to the fourth embodiment of the present invention will be explained below. FIG. 9 shows the arrangement of the booster unit. The booster unit shown in FIG. 9 is connected to a dual-mode radio communication apparatus via a vehicle-mount kit, and amplifies an RF signal communicated between this dual-mode radio communication apparatus and a base station as needed.

The dual-mode radio communication apparatus used in this embodiment is the same as that in the second or third embodiment described above, and the vehicle-mount kit is also the same as that in the third embodiment. Therefore, a description of the dual-mode radio communication apparatus and vehicle-mount kit will be omitted. Note that the dual-mode radio communication apparatus inputs a mode identification signal indicating the communication mode to the booster unit via the vehicle-mount kit.

The booster unit shown in FIG. 9 comprises an RF signal input/output terminal 301, which is connected to the connection terminal 221 of the vehicle-mount kit shown in FIG. 6 to input/output an RF signal, and an input terminal 302, which is connected to the connection terminal 222 of the vehicle-mount kit to receive the mode identification signal.

The RF signal input/output terminal 301 is connected to an antenna connection terminal 320 in a route according to the switching states of switching circuits 321 and 322. The antenna connection terminal 320 is connected to an external antenna (not shown).

The switching circuits 321 and 322 are switched by the output from a switching circuit 307 (to be described later), and connect the RF signal input/output terminal 301 and antenna connection terminal 320 without the intervention of a booster circuit 310 (i.e., while bypassing it) in the initial state.

As has also been described in the third embodiment, the booster circuit 310 amplifies an RF signal communicated with the base station via the external antenna, and has an arrangement shown in, e.g., FIG. 8. The booster circuit 310 detects the signal strength of a transmission RF signal input to the booster unit, and outputs it to the first input terminal of a level comparator 318.

A power supply circuit 306 generates a predetermined operation power supply voltage Vcc on the basis of the output from a battery (not shown) mounted on a vehicle, and supplies it to the switching circuit 307. The switching circuit 307 is switched by a booster control circuit 308.

The booster control circuit 308 switches the switching circuit 307 in accordance with the mode identification signal input to the input terminal 302. When the mode identification signal indicates the digital mode, the circuit 308 opens the switching circuit 307; when the mode identification signal indicates the analog mode, it short-circuits the switching circuit 307.

With this switching control, the switching circuit 307 supplies the power supply voltage Vcc to a reception power amplifier 317 in a booster circuit 310 and also inputs it to a switching circuit.309 in the analog mode.

The power supply voltage Vcc that has passed through the switching circuit 307 in the analog mode is input to the switching circuits 321 and 322 as a switching control signal, thereby connecting the RF signal input/output terminal 301 and antenna connection terminal 320 via the booster circuit 310.

The switching circuit 309 is switched by the comparison result of the level comparator 318. The level comparator 318 compares the signal strength input to its first input terminal with a reference signal strength ref input to its second input terminal, i.e., the signal strength of a transmission RF signal input to the booster unit with the preset reference signal strength ref.

As a result of comparison, when the signal strength of the transmission RF signal is lower than the reference signal strength ref, the switching circuit 309 is short-circuited to supply the power supply voltage Vcc to the transmission power amplifier 313 of the booster circuit 310.

The operation of the booster unit with the above arrangement will be explained below.

The dual-mode radio communication apparatus is connected to the connector 201 of the vehicle-mount kit, and the connection terminals 221 and 222 of the vehicle-mount kit are respectively connected to the RF signal input/output terminal 301 and input terminal 302 of the booster unit.

In this state, when the user selects the digital mode as the communication mode or the digital mode is selected as the communication mode by a instruction from a base station, a controller of the dual-mode radio communication apparatus informs the booster unit via the vehicle-mount kit using the mode identification signal that the digital mode has been selected as the communication mode.

In the booster unit, when the mode identification signal is input to the booster control circuit 308 to inform it of the digital mode, the booster control circuit 308 opens the switching circuit 307.

As a consequence, in the booster unit, the power supply voltage Vcc is not supplied to the transmission power amplifier 313 and reception power amplifier 317 of the booster circuit 310, and the switching circuits 321 and 322 are maintained in the initial state, thus connecting the RF signal input/output terminal 301 to the antenna connection terminal 320 while bypassing the booster circuit 310.

In this way, the dual-mode radio communication apparatus connected to the booster unit communicates with a base station via the external antenna in the digital mode, since the RF signal input/output terminal 301 is connected to the antenna connection terminal 320 while bypassing the booster circuit 310.

On the other hand, when the user selects the analog mode as the communication mode, the controller of the dual-mode radio communication apparatus sends a message indicating this to the booster unit.

In the booster unit, when the mode identification signal is input to the booster control circuit 308 to inform it that the analog mode has been selected, the booster control circuit 308 short-circuits the switching circuit 307.

Consequently, in the booster unit, the power supply voltage Vcc is supplied to the reception power amplifier 317 of the booster circuit 310, and is also input to the switching circuits 321 and 322 as a switching control signal. In accordance with this switching control signal, the switching circuits 321 and 322 connect the RF signal input/output terminal 301 and antenna connection terminal 320 via the booster circuit 310.

Hence, the dual-mode radio communication apparatus connected to the booster unit communicates with the base station via the booster circuit 310 in the analog mode using the external antenna.

As described above, when the communication mode of the dual-mode radio communication apparatus connected is the analog mode, the booster unit with the above arrangement connects the dual-mode radio communication apparatus to the external antenna via the booster circuit 310. On the other hand, when the communication mode is the digital mode, the booster unit connects the dual-mode radio communication apparatus to the external antenna while bypassing the booster circuit 310.

Hence, according to the booster unit with the above arrangement, even when the dual-mode radio communication apparatus connected is switched from the analog mode to the digital mode or the dual-mode radio communication apparatus set in the digital mode is connected, the dual-mode radio communication apparatus can make normal communications.

Note that the present invention is not limited to the above-mentioned embodiments. For example, in the second to fourth embodiments, the controller of the dual-mode radio communication apparatus inputs a mode identification signal to the vehicle-mount kit using connector connection, and the vehicle-mount kit and booster unit connected thereto make switching control corresponding to the communication mode.

However, according to the present invention, in place of such embodiments, a superposing circuit shown in, e.g., FIG. 10 may be inserted immediately after the output of the transmission circuit 106 of the dual-mode radio communication apparatus so as to superpose information for identifying the communication mode on the transmission RF signal.

The superposing circuit shown in FIG. 10 outputs a transmission output signal from the transmission circuit 106 to the switching circuit 102 via a capacitor 401. The output terminal of the superposing circuit also receives a superposing signal (e.g., DC component) generated by a superposing signal generator 403 via a resistor 402, thereby superposing the superposing signal on the transmission RF signal.

The superposing signal generator 403 outputs a DC voltage generated by a power supply circuit 404 in accordance with a mode identification signal output from the controller of the dual-mode radio communication apparatus to the resistor 402. For example, when the mode identification signal indicates the analog mode, the generator 403 outputs a Hi level signal of a predetermined potential; when the mode identification signal indicates the digital mode, the generator 403 outputs a Lo level signal of a predetermined potential.

The vehicle-mount kit shown in FIG. 5 or the booster unit shown in FIG. 7 or 9 may extract the communication mode information superposed on the transmission RF signal, and may make switching control on the basis of the extracted information.

In such embodiment, no line for sending the mode identification signal is required between the dual-mode radio communication apparatus and vehicle-mount kit or between the vehicle-mount kit and booster unit.

When this embodiment is applied to the vehicle-mount kit shown in FIG. 5, the transmission RF signal superposed with the Hi level signal may be input as the switching control signal for the switching circuit 206 in place of the output from the switch control circuit 210, thereby switching the circuit 206 to the antenna connection terminal 208 side in the analog mode.

On the other hand, when this embodiment is applied to the booster unit shown in FIG. 7 or 9, the transmission RF signal may be input as the switching control signal of, e.g., the switching circuit 307 in place of the output from the booster control circuit 308, thus short-circuiting the circuit 307 in the analog mode. In this case, a capacitor for removing the DC component superposed on the transmission RF signal is inserted between the RF signal input/output terminal 301 and the switching circuit 303 or 321.

In place of such embodiment, the mode identification signal may be input to the vehicle-mount kit using connector connection between the dual-mode radio communication apparatus and the vehicle-mount kit as in the second to fourth embodiments, and the superposing circuit shown in FIG. 10 may be added to the vehicle-mount kit shown in FIG. 5 or 6 to superpose identification information of the communication mode onto the transmission RF signal between the vehicle-mount kit and booster unit.

In such embodiment as well, since no line for outputting the mode identification signal is required between the vehicle-mount kit and booster unit, they can be connected via an RF cable alone.

In addition, various changes and modifications may be made within the spirit and scope of the invention.

To restate, in the dual-mode radio communication apparatus according to the present invention, when an external apparatus is connected to the interface for inputting/outputting an RF signal, a communication is made using the built-in antenna in the digital mode, and a communication is made by inputting/outputting an RF signal via the interface in the analog mode.

Hence, according to the present invention, when an apparatus for amplifying an RF signal is connected to the interface, since a communication is made using the built-in antenna in the digital mode, a dual-mode radio communication apparatus which can make communications even when the amplifying apparatus connected is not compatible with the digital mode, can be provided.

Also, according to the present invention, a power supply device comprises antenna connection means and booster connection means. When the radio communication apparatus connected communicates in the digital mode, the RF signal input/output terminal of the radio communication apparatus is connected to the antenna connection means; when the apparatus communicates in the analog mode, the RF signal input/output terminal of the radio communication apparatus is connected to the booster connection means.

Therefore, according to the present invention, the radio communication apparatus communicates using an antenna connected to the antenna connection means in the digital mode, and communicates by amplifying an RF signal in the analog mode since the apparatus is connected to the booster unit via the booster connection means. Hence, a power supply device, which allows communications while the radio communication apparatus is kept connected to the booster unit even when the booster unit is not compatible with the digital mode, can be provided.

Furthermore, according to the present invention, an RF amplifier comprises first antenna connection means and second antenna connection means via RF signal amplification means. When the radio communication apparatus communicates in the digital mode, the RF signal input/output terminal of the radio communication apparatus is connected to the first antenna connection means; when the apparatus communicates in the analog mode, the RF signal input/output terminal of the radio communication apparatus is connected to the RF signal amplification means.

Therefore, according to the present invention, a communication is made via the first antenna connection means and first antenna in the digital mode, and is made via the second antenna connection means and second antenna by amplifying an RF signal in the analog mode since the apparatus is connected to the RF amplification means. For this reason, an RF signal amplifier which allows communications while the radio communication apparatus is kept connected to the RF signal amplifier even when the RF signal amplification means is not compatible with the digital mode, can be provided.

Moreover, according to the present invention, when a communication is made in the digital mode, the RF signal input/output terminal of the radio communication apparatus is connected to the antenna connection means; when a communication is made in the analog mode, the RF signal input/output terminal of the radio communication apparatus is connected to the antenna connection means via the RF signal amplification means.

Hence, according to the present invention, a communication is made without the intervention of the RF signal amplification means in the digital mode, while a communication is made by amplifying an RF signal by the RF signal amplification means in the analog mode. Therefore, an RF signal amplifier which allows communications while the radio communication apparatus is kept connected to the RF signal amplifier even when the RF signal amplification means is not compatible with the digital mode, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dual-mode radio communication apparatus capable of communicating with a base station which can be connected to a public network, by selectively using one of communication modes including an analog mode and digital mode comprising:

means for connecting the apparatus to an external device including a booster unit for boosting an RF signal generated by the apparatus;

means for determining whether the apparatus is in analog mode or digital mode and whether the external device is connected to the means for connecting; and communication means, for communicating the RF signal directly to the base station if the means for determining determines that the apparatus is in the digital mode, and for communicating the boosted RF signal to the base station via said external apparatus if the means for determining determines that the apparatus is in the analog mode and the external device is connected to the means for connecting.

2. A dual-mode radio communication apparatus capable of communicating with a base station which can be connected to a public network, by selectively using one of communication modes including an analog mode and digital mode, comprising:

communication means upon connected to an external apparatus, for communicating an RF signal directly to the base station in the digital mode, and for communicating the RF signal to the base station via said external apparatus in the analog mode;

wherein the RF signal is superposed with information for identifying the communication mode; and identification information extraction means for extracting the information for identifying the communication mode from the RF signal;

wherein said communication means communicates the RF signal directly to the base station when the information extracted by said identification information extraction means indicates the digital mode, and communicates the RF signal to the base station via said external apparatus when the extracted information indicates the analog mode.

3. A dual-mode radio communication apparatus capable of communicating with a base station which can be connected to a public network, by selectively using one of communication modes including an analog mode and digital mode, the apparatus connectable to an external device including a booster unit for boosting an RF signal generated by the apparatus, comprising:

a portable unit having an input/output terminal of an RF signal to be communicated with the base station;

an antenna for transmitting/receiving the RF signal;

an interface unit for inputting/outputting the RF signal;

a controller for determining if the apparatus is in analog mode or digital mode and for determining if the interface unit is connected to the external device; and connection switching means for connecting the RF signal input/output terminal of said portable unit directly to said antenna when the controller determines that the apparatus is in the digital mode, and connecting the RF signal input/output terminal of said portable unit to said antenna via said interface unit when the controller determines that the apparatus is in the analog mode and that the external device is connected to interface unit.

4. A dual-mode radio communication apparatus capable of communicating with a base station which can be connected to a public network, by selectively using one of communication modes including an analog mode and digital mode, comprising:

a portable unit having an input/output terminal of an RF signal to be communicated with the base station;

an antenna for transmitting/receiving the RF signal;

an interface unit for inputting/outputting the RF signal;

connection switching means upon connecting an external apparatus to said interface unit for connecting the RF signal input/output terminal of said portable unit directly to said antenna in the digital mode, and connecting the RF signal input/output terminal of said portable unit to said antenna via said interface unit in the analog mode;

wherein the RF signal input from said portable unit is superposed with information for identifying the communication mode; and identification information extraction means for extracting the information for identifying the communication mode from the RF signal input from said portable unit;

wherein said connection switching means connects the RF signal input/output terminal of said portable unit directly to said antenna when the information extracted by said identification information extraction means indicates the digital mode, and connects the RF signal input/output terminal of said portable unit to said antenna via said interface unit when the extracted information indicates the analog mode.

5. A dual-mode radio communication apparatus capable of communicating with a base station which can be connected to a public network, by selectively using one of communication modes including an analog mode and digital mode the apparatus connectable to an external device including a booster unit for boosting an RF signal generated by the apparatus, comprising:

a portable unit having an input/output terminal of an RF signal to be communicated with the base station;

a first antenna for transmitting/receiving the RF signal;

a second antenna for transmitting/receiving the RF signal;

a controller for determining if the apparatus is in analog mode or digital mode and determining if the external device is connected to the interface unit;

an interface unit which is connected to said second antenna and inputs/outputs the RF signal via said second antenna; and connection switching means for connecting the RF signal input/output terminal of said portable unit to said first antenna when the controller determines that the apparatus is in the digital mode, and connecting the RF signal input/output terminal of said portable unit to said interface unit when the controller determines that the apparatus is in the analog mode and that the external device is connected to the interface unit.

6. A dual-mode radio communication apparatus capable of communicating with a base station which can be connected to a public network, by selectively using one of communication modes including an analog mode and digital mode, comprising:

a portable unit having an input/output terminal of an RF signal to be communicated with the base station;

a first antenna for transmitting/receiving the RF signal;

a second antenna for transmitting/receiving the RF signal;

an interface unit which is connected to said second antenna and inputs/outputs the RF signal via said second antenna;

connection switching means upon connecting an external apparatus to said interface unit for connecting the RF signal input/output terminal of said portable unit to said first antenna in the digital mode, and connecting the RF signal input/output terminal of said portable unit to said interface unit in the analog mode;

wherein the RF signal input from said portable unit is superposed with information for identifying the communication mode; and identification information extraction means for extracting the information for identifying the communication mode from the RF signal input from said portable unit;

wherein said connection switching means connects the RF signal input/output terminal of said portable unit to said first antenna when the information extracted by said identification information extraction means indicates the digital mode, and connects the RF signal input/output terminal of said interface unit to said interface unit when the extracted information indicates the analog mode.

7. A dual-mode radio communication apparatus capable of communicating with a base station which can be connected to a public network, by selectively using one of communication modes including an analog mode and digital mode, the apparatus connectable to an external device including a booster unit for boosting an RF signal generated by the apparatus, comprising:

a portable unit which comprises a first antenna for transmitting/receiving an RF signal to be communicated with the base station, and has an input/output terminal of the RF signal;

an interface unit which is connected to a second antenna for transmitting/receiving the RF signal, and inputs/outputs the RF signal;

a controller for determining if the apparatus is in analog mode or digital mode; and if the external device is connected to the interface unit; and connection switching means connecting the RF signal input/output terminal of said portable unit to said first antenna when the controller determines that the apparatus is in the digital mode, and connecting the RF signal input/output terminal of said portable unit to said interface unit when the controller determines that the apparatus is in the analog mode.

8. A dual-mode radio communication apparatus capable of communicating with a base station which can be connected to a public network, by selectively using one of communication modes including an analog mode and digital mode, comprising:

a portable unit which comprises a first antenna for transmitting/receiving an RF signal to be communicated with the base station, and has an input/output terminal of the RF signal;

an interface unit which is connected to a second antenna for transmitting/receiving the RF signal, and inputs/outputs the RF signal;

connection switching means upon connecting an external apparatus to said interface unit for connecting the RF signal input/output terminal of said portable unit to said first antenna in the digital mode, and connecting the RF signal input/output terminal of said portable unit to said interface unit in the analog mode;

wherein the RF signal input from said portable unit is superposed with information for identifying the communication mode; and identification information extraction means for extracting the information for identifying the communication mode from the RF signal input from said portable unit;

wherein said connection switching means connects the RF signal input/output terminal of said portable unit to said first antenna when the information extracted by said identification information extraction means indicates the digital mode, and connects the RF signal input/output terminal of said interface unit to said interface unit when the extracted information indicates the analog mode.

9. A power supply device for generating an operation power supply voltage on the basis of an output from a battery equipped in a mobile station, and supplying the operation power supply voltage to a radio communication apparatus, comprising:

antenna connection means connected to an antenna for communicating an RF signal to be communicated between a base station and said radio communication apparatus;

a booster unit for amplifying the RF signal; and a controller for determining if the apparatus is in an analog mode or a digital mode; and connection switching means for inhibiting the electrical power from supplying to the booster unit and for connecting an RF signal input/output terminal of said radio communication apparatus directly to said antenna connection means when the controller determines that said radio communication apparatus communicates in the digital mode, and for enabling the electrical power to be supplied to the booster unit and for connecting the RF signal input/output terminal of said radio communication apparatus to said antenna connection means via said booster unit when the controller determines that said radio communication apparatus communicates in the analog mode.

10. A device according to claim 9, wherein the RF signal input from said radio communication apparatus is superposed with information for identifying the communication mode, said device further comprises identification information extraction means for extracting the information for identifying the communication mode from the RF signal input from said radio communication apparatus, and said connection switching means connects the RF signal input/output terminal of said radio communication apparatus directly to said antenna connection means when the information extracted by said identification information extraction means indicates the digital mode, and connects the RF signal input/output terminal of said radio communication apparatus to said antenna connection means via said booster unit when the extracted information indicates the analog mode.

11. A power supply device for generating an operation power supply voltage on the basis of an output from a battery equipped in a mobile station, and supplying the operation power supply voltage to a radio communication apparatus, comprising:
first antenna means connected to a first antenna for communicating an RF signal to be communicated between a base station and said radio communication apparatus;
second antenna connection means connected to a second antenna for communicating the RF signal to be communicated between said base station and said radio communication apparatus;
a booster unit which is connected to said second antenna connection means and amplifies the RF signal transmitted/received via said second antenna connection means;
a controller for determining if the apparatus is in an analog mode or a digital mode; and
connection switching means for inhibiting the electrical power from supplying to the booster unit and for connecting an RF signal input/output terminal of said radio communication apparatus to said first antenna connection means when the controller determines that said radio communication apparatus communicates in a digital mode, and for enabling the electrical power to be supplied to the booster unit and for connecting the RF signal input/output terminal of said radio communication apparatus to said booster unit when the controller determines that said radio communication apparatus communicates in an analog mode.

12. A device according to claim 11, wherein the RF signal input from said radio communication apparatus is superposed with information for identifying the communication mode,
said device further comprises identification information extraction means for extracting the information for identifying the communication mode from the RF signal input from said radio communication apparatus, and
said connection switching means inhibits the electrical power from supplying to the booster unit and connects the RF signal input/output terminal of said radio communication apparatus to said first antenna connection means when the information extracted by said identification information extraction means indicates the digital mode, and enables the electrical power to be supplied to the booster unit and connects the RF signal input/output terminal of said radio communication apparatus to said booster unit when the extracted information indicates the analog mode.

13. An RF signal amplifier comprising:
antenna connection means for connecting an antenna which transmits/receives an RF signal to be-communicated between a base station and a radio communication apparatus;
RF signal amplification means for amplifying the RF signal;
a controller for determining if the apparatus communicates in an analog mode or digital mode; and
connection switching means for connecting an RF signal input/output terminal of said radio communication apparatus directly to said antenna connection means when the controller determines that said radio communication apparatus communicates in a digital mode, and connecting the RF signal input/output terminal of said radio communication apparatus to said antenna connection means via said RF signal amplification means when the controller determines that said radio communication apparatus communicates in the analog mode.

14. An amplifier according to claim 13, wherein the RF signal input from said radio communication apparatus is superposed with information for identifying the communication mode,
said amplifier further comprises identification information extraction means for extracting the information for identifying the communication mode from the RF signal input from said radio communication apparatus, and
said connection switching means connects the RF signal input/output terminal of said radio communication apparatus directly to said antenna connection means when the information extracted by said identification information extraction means indicates the digital mode, and connects the RF signal input/output terminal of said radio communication apparatus to said antenna connection means via said RF signal amplification means when the extracted information indicates the analog mode.

15. An RF signal amplifier comprising:
first antenna connection means for connecting a first antenna which transmits/receives an RF signal to be communicated between a base station that can be connected to a public network, and a radio communication apparatus, wherein the RF signal is superposed with information for identifying the communication mode;
identification information extraction means for extracting the information for identifying the communication mode from the RF signal input from said radio communication apparatus;
second antenna connection means for connecting a second antenna which transmits/receives the RF signal;
RF signal amplification means, connected to said second antenna connection means, for amplifying the RF signal transmitted/received via said second antenna connection means;
a controller for determining if the apparatus is in a analog mode or digital mode; and
connection switching means for connecting an RF signal input/output terminal of said radio communication apparatus to said first antenna connection means when the controller determines that said radio communication apparatus communicates in the digital mode, and connecting the RF signal input/output terminal of said radio communication apparatus to said RF signal amplification means when the controller determines that said radio communication apparatus communicates in the analog mode,
wherein said connecting switching means connects the RF signal input/output terminal of said radio communication apparatus to said first antenna connection means when the information extracted by said identification information extraction means indicates the digital mode, and connecting the RF signal input/output terminal of said radio communication apparatus to said RF signal amplication means when the extracted information indicates the analog mode.

16. A dual-mode radio communication apparatus capable of communicating with a base station which can be connected to a public network, by selectively using one of communication modes including an analog mode and digital mode, comprising:

generating means for generating an RF signal to be transmitted;

a controller for determining if the apparatus is in analog mode or digital mode; and communication means, upon connecting the communication apparatus to a booster device for boosting the generated RF signal, for transmitting the generated RF signal directly to the base station when the controller determines that the apparatus is in the digital mode, and for transmitting the boosted signal to the base station via the booster device when the controller determines that the apparatus is in the analog mode.

17. An apparatus according to claim 16, wherein the RF signal is superposed with information for identifying the communication mode, said apparatus further comprises identification information extraction means for extracting the information for identifying the communication mode from the RF signal, and said communication means transmits the generated RF signal directly to the base station when the information extracted by said identification information extraction means indicates the digital mode, and transmits the boosted signal to the base station when the extracted information indicates the analog mode.

* * * * *

UNITED STATES PATENT AND TRADEMARK OFFICE
CERTIFICATE OF CORRECTION

PATENT NO. : 6,449,499 B1
DATED : September 10, 2002
INVENTOR(S) : Ishikura et al.

It is certified that error appears in the above-identified patent and that said Letters Patent is hereby corrected as shown below:

Column 26,
Line 46, change "mode the" to -- mode, the --.

Column 29,
Line 56, change "be-communicated" to -- be communicated --.

Column 30,
Line 44, change "a analog" to -- an analog --.

Signed and Sealed this

Eighth Day of April, 2003

JAMES E. ROGAN
*Director of the United States Patent and Trademark Office*